United States Patent
Ishii et al.

(10) Patent No.: US 11,601,834 B2
(45) Date of Patent: Mar. 7, 2023

(54) MOBILE STATION, RADIO BASE STATION, AND COMMUNICATION CONTROL METHOD

(75) Inventors: Hiroyuki Ishii, Yokohama (JP); Mikio Iwamura, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 43 days.

(21) Appl. No.: 13/579,085

(22) PCT Filed: Feb. 15, 2011

(86) PCT No.: PCT/JP2011/053175
§ 371 (c)(1),
(2), (4) Date: Oct. 24, 2012

(87) PCT Pub. No.: WO2011/099631
PCT Pub. Date: Aug. 18, 2011

(65) Prior Publication Data
US 2013/0034006 A1  Feb. 7, 2013

(30) Foreign Application Priority Data
Feb. 15, 2010 (JP) .............................. JP2010-030754

(51) Int. Cl.
*H04W 24/00* (2009.01)
*H04W 24/10* (2009.01)
(Continued)

(52) U.S. Cl.
CPC ............. *H04W 24/10* (2013.01); *H04L 5/001* (2013.01); *H04L 5/0057* (2013.01); *H04W 36/0058* (2018.08); *H04W 36/0085* (2018.08)

(58) Field of Classification Search
CPC ............. H04W 24/10; H04W 36/0085; H04W 36/0058; H04L 5/001; H04L 5/0057
(Continued)

(56) References Cited

U.S. PATENT DOCUMENTS

2007/0232341 A1  10/2007 Sakata
2008/0285477 A1* 11/2008 Kuroda ................. H04L 1/0026
                                                    370/252
(Continued)

FOREIGN PATENT DOCUMENTS

JP      04-200032 A   7/1992
JP      7-38943 A     2/1995
(Continued)

OTHER PUBLICATIONS

Office Action in corresponding Mexican application No. MX/a/2012/009478 dated Apr. 17, 2013 (4 pages).
(Continued)

*Primary Examiner* — Derrick V Rose
(74) *Attorney, Agent, or Firm* — Osha Bergman Watanabe & Burton LLP

(57) ABSTRACT

A mobile station UE includes a measurement unit 102 configured to measure radio quality of a cell during communication or a neighboring cell for each of the two or more carriers, a determination unit 104 configured to determine whether to notify the radio base station eNB of a measurement result regarding each of the two or more carriers in the measurement unit 102, and a transmission unit 106 configured to transmit the measurement result in the measurement unit 102 to the radio base station eNB, wherein the transmission unit 106 transmits, in addition to the measurement result regarding a carrier in which it is determined by the determination unit 104 to notify the radio base station eNB of the measurement result in the measurement unit 102, a measurement result regarding a carrier other than the carrier.

5 Claims, 11 Drawing Sheets

(51) Int. Cl.
*H04L 5/00* (2006.01)
*H04W 36/00* (2009.01)

(58) Field of Classification Search
USPC ............. 370/252, 241; 455/67.11, 517
See application file for complete search history.

(56) References Cited

U.S. PATENT DOCUMENTS

| | | | | |
|---|---|---|---|---|
| 2009/0047956 A1* | 2/2009 | Moe | ............. | H04J 11/0093 |
| | | | | 455/436 |
| 2009/0061878 A1* | 3/2009 | Fischer | ............. | H04W 28/0278 |
| | | | | 455/436 |
| 2009/0161639 A1* | 6/2009 | Ostergren | ............. | H04W 48/16 |
| | | | | 370/338 |
| 2010/0022250 A1* | 1/2010 | Petrovic | ............. | H04J 11/0093 |
| | | | | 455/450 |
| 2010/0041384 A1* | 2/2010 | Kazmi | ............. | H04W 88/10 |
| | | | | 455/419 |
| 2010/0048224 A1* | 2/2010 | Klatt | ............. | H04W 16/18 |
| | | | | 455/456.1 |
| 2010/0273514 A1* | 10/2010 | Koo | ............. | H04B 7/024 |
| | | | | 455/501 |
| 2010/0279682 A1* | 11/2010 | Rangaiah | ............. | H04W 36/0088 |
| | | | | 455/426.1 |
| 2010/0322079 A1* | 12/2010 | Kitazoe et al. | ............. | 370/241 |
| 2011/0170418 A1* | 7/2011 | Sagfors | ............. | H04W 36/0083 |
| | | | | 370/241 |
| 2011/0269453 A1* | 11/2011 | Ranta-Aho | ............. | H04L 5/001 |
| | | | | 455/424 |
| 2012/0076041 A1* | 3/2012 | Jung | ............. | H04W 24/10 |
| | | | | 370/252 |
| 2012/0094673 A1* | 4/2012 | Sebire | ............. | H04W 36/0085 |
| | | | | 455/436 |
| 2012/0115459 A1* | 5/2012 | Deng | ............. | H04W 36/0094 |
| | | | | 455/422.1 |
| 2012/0163338 A1* | 6/2012 | Zhang | ............. | H04L 5/0092 |
| | | | | 370/331 |
| 2013/0215772 A1* | 8/2013 | Kaur et al. | ............. | 370/252 |

FOREIGN PATENT DOCUMENTS

| | | |
|---|---|---|
| JP | 2009-200634 A | 9/2009 |
| WO | 2011082907 A1 | 7/2011 |

OTHER PUBLICATIONS

International Search Report w/translation from PCT/JP2011/053175 dated Mar. 22, 2011 (4 pages).
3GPP TSG-RAN2 #68 meeting, R2-096495; "Measurement Consideration in CA"; Huawei; Jeju, Korea; Nov. 9-13, 2009 (4 pages).
3GPP TSG-RAN WG2 #68bis, R2-100122; "Measurements for carrier aggregation"; Ericsson; Valencia, Spain; Jan. 18-22, 2010 (8 pages).
3GPP TSG-RAN WG2 Meeting #68bis, R2-100557; "Carrier aggregation considerations"; Pantech; Valencia, Spain; Jan. 18-22, 2010 (2 pages)q.
Japanese Office Action w/English translation dated Mar. 22, 2011 corresponding in Japanese Application No. 2010-030754 (6 pages).
Japanese Office Action w/English translation dated Jul. 19, 2011 corresponding in Japanese Application No. 2010-030754 (7 pages).
Patent Abstracts of Japan Publication No. 04-200032 dated Jul. 21, 1992 (1 page).
3GPP TR 36.913 V8.0.1; "3rd Generation Partnership Project; Technical Specification Group Radio Access Network Requirements for further advancements for Evolved Terrestrial Radio Access (E-UTRA) (LTE-Advanced) (Release 8)" Mar. 2009 (15 pages).
3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
3GPP TS 36.214 V8.3.0; "3rd Generation Partnership Project; Technical Specification Group Radio Access Network; Evolved Universal Terrestrial Radio Access (E-UTRA); Physical layer—Measurements (Release 8)"; May 2008 (11 pages).
Japanese Office Action issued in Japanese Patent Application No. 2010-030754, dated Jul. 19, 2011, with English translation thereof (8 pages).
3GPP TSG-RAN WG2 Meeting #68bis, R2-100557, "Carrier Aggregation Considerations," Pantech, Valencia, Spain, Jan. 18-22, 2010 (2 pages).
3GPP TSG-RAN #68bis, Tdoc R2-100122, "Measurements for Carrier Aggregation," Ericsson, ST-Ericsson, Valencia, Spain, Jan. 18-22, 2010 (8 pages).
Korean Office Action issued in Korean Patent Application No. 10-2012-7021873, dated Jan. 16, 2014, with English translation thereof (7 pages).
Office Action for corresponding Australian Application No. 2011215136, dated Sep. 4, 2013 (3 pages).
Office Action for corresponding Japanese Application No. 2011-199502, dated Oct. 1, 2013 (5 pages).
CATT; "Handover for Carrier Aggregation;" 3GPP TSG RAN WG2 Meeting #66bis, R2-093722; Los Angeles, USA; Jun. 19-Jul. 3, 2009 (3 pages).
ZTE; "Candidate cell set for CC management and handover;" 3GPP TSG RAN WG2 #69, R2-101096; San Francisco, USA; Feb. 22-26, 2010 (5 pages).
Huawei; "Intra LTE—A UE Handover Procedure inter-eNB for CA;" 3GPP TSG RAN WG2 Meeting #67, R2-094731; Shenzhen, China; Aug. 24-28, 2009 (5 pages).
Office Action issued in corresponding European Patent Application No. 11742370.7, dated Sep. 23, 2014 (7 pages).
CATT; "Measurement in CA"; 3GPP TSG RAN WG2 meeting #68bis, R2-100063; Valencia, Spain, Jan. 18-22, 2010 (4 pages).
LG Electronics Inc.; "Measurement configuration structure for carrier aggregation"; 3GPP TSG RAN2 meeting #68, R2-097017; Jeju, Korea, Nov. 9-14, 2009 (4 pages).
Office Action issued in corresponding Canadian Application No. 2,789,916, dated Sep. 30, 2014 (2 pages).
Office Action in counterpart Chinese Patent Application No. 201180009657.9 dated Jan. 12, 2015 (18 pages).
Office Action in counterpart European Patent Application No. 11742370.7, dated Aug. 13, 2015 (6 pages).
Office Action in counterpart Chinese Patent Application No. 2011800096579, dated May 15, 2015 (13 pages).
Office Action in counterpart Australian Patent Application No. 2014202741, dated Jun. 18, 2015 (3 pages).
Office Action in counterpart Chinese Patent Application No. 201180009657.9, dated Aug. 31, 2015 (12 pages).
Office Action in counterpart Australian Patent Application No. 2014202741, dated Oct. 2, 2015 (3 pages).
Summons to Attend Oral Proceedings Pursuant to Rule 115(1) EPC issued in corresponding European Application No. 11742370.7, dated April 7, 2016 (4 pages).
Extended European Search Report issued in corresponding European Application No. 11742370.7, dated Apr. 7, 2016 (4 pages).
Office Action in counterpart Australian Patent Application No. 2014202741, dated Jan. 28, 2016 (4 pages).
Office Action issued in the counterpart Australian Patent Application No. 2014202741, dated Jun. 16, 2016 (3 pages).
Office Action issued in the counterpart Australian Patent Application No. 2014202741, dated Jun. 6, 2016 (3 pages).
Office Action issued in the counterpart European Patent Application No. 11742370.7, dated Oct. 21, 2016 (14 pages).
Office Action issued in the counterpart Canadian Patent Application No. 2864791, dated Sep. 16, 2016 (4 pages).
Office Action issued in the counterpart Canadian Patent Application No. 2864791, dated Jul. 31, 2017 (4 pages).
Office Action issued in corresponding Canadian Application No. 2,864,791, dated Mar. 8, 2018 (4 pages).
Office Action issued in corresponding Indian Application No. 2316/KOLNP/2012, dated Nov. 6, 2018 (6 pages).

(56) References Cited

OTHER PUBLICATIONS

Office Action issued in corresponding European Application No. 16204992.8, dated Sep. 10, 2018 (6 pages).
Office Action issued in corresponding Canadian Application No. 2,864,791, dated Jan. 29, 2019 (4 pages).
Office Action issued in the counterpart Canadian Patent Application No. 2,864,791, dated Oct. 10, 2019 (4 pages).
Office Action issued in Brazilian Application No. BR112012020483-1, dated Apr. 14, 2020 (6 pages).
Office Action issued in the counterpart Canadian Patent Application No. 2,864,791, dated Oct. 8, 2020 (4 pages).
Office Action issued in the counterpart European Patent Application No. 16204992.8, dated Sep. 9, 2020 (12 pages).
Office Action issued in the counterpart Canadian Patent Application No. 2,864,791, dated Oct. 12, 2021 (5 pages).
Office Action issued in counterpart Brazilian Application No. BR112012020483-1 dated Aug. 3, 2021 (159 pages).
Office Action issued in Brazilian Application No. 112012020483-1; dated Dec. 28, 2021 (13 pages).
Extended European Search Report dated Apr. 3, 2017, in corresponding European Application No. 16204992.8 (9 pages).
Office Action in counterpart Canadian Patent Application No. 2,864,791 dated Sep. 13, 2022 (7 pages).

* cited by examiner

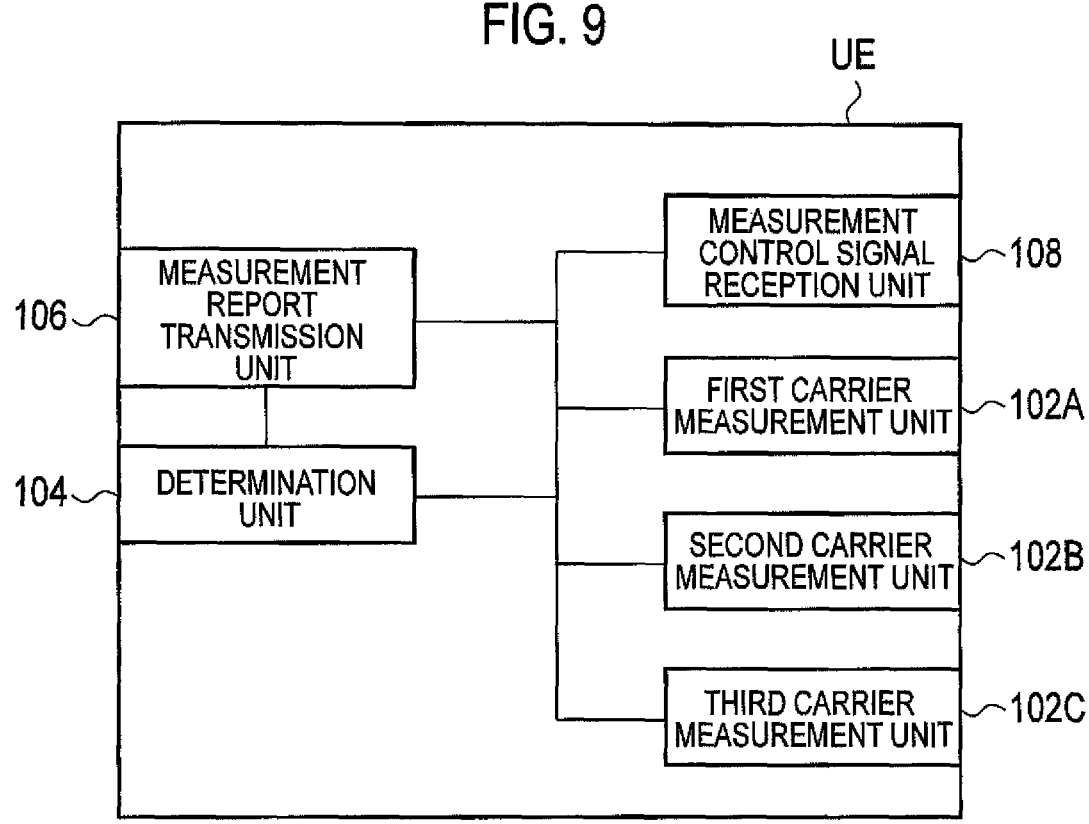
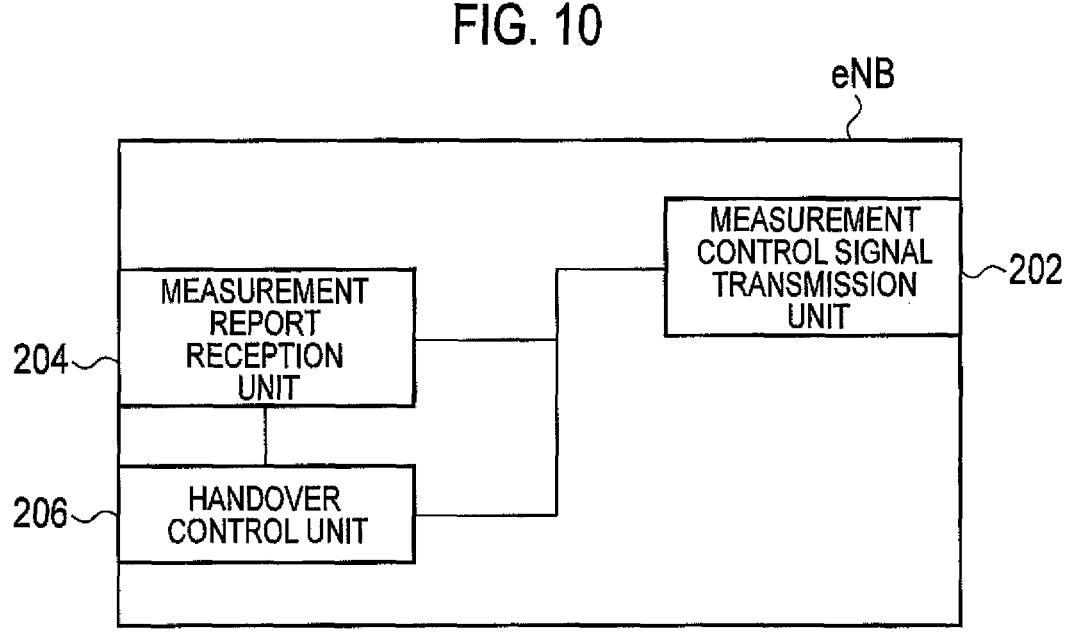

MOBILE STATION, RADIO BASE STATION, AND COMMUNICATION CONTROL METHOD

TECHNICAL FIELD

The present invention relates to a mobile station, a radio base station, and a communication control method.

BACKGROUND ART

A communication scheme, which is the next generation of a WCDMA (Wideband Code Division Multiplexing Access) scheme, an HSDPA (High-Speed Downlink Packet Access) scheme, an HSUPA (High-Speed Uplink Packet Access) scheme and the like, that is, an LTE (Long Term Evolution) scheme has been discussed in the 3GPP, which is a group aiming to standardize WCDMA, and specification of the LTE scheme is under progress.

Furthermore, an LTE-advanced scheme has been discussed in the 3GPP as the next communication scheme of the LTE scheme. Requirements of the LTE-advanced scheme have been collected in Non Patent Literature 1.

In the LTE-advanced scheme, performing "Carrier aggregation" has been agreed as requirements. When the "Carrier aggregation" is performed, it is possible for a mobile station UE to simultaneously receive downlink signals using a plurality of carriers, or to simultaneously transmit uplink signals using a plurality of carriers. Each carrier when the "Carrier aggregation" is performed is called "Component Carrier".

Meanwhile, in a mobile communication system provided with a plurality of cells, a mobile station UE (User Equipment) is configured to switch a cell and continuously perform communication when moving from one cell to another cell. The cell switching will be referred to as a "handover".

In general, in the mobile communication system, when the mobile station UE moves to a neighboring cell and then the radio quality of a signal from the neighboring cell in the mobile station UE is stronger than the radio quality of a signal from a serving cell, the mobile station UE is configured to be handed over to the neighboring cell.

Note that the radio quality of the signal, for example, includes the received power of the signal. More specifically, the received power of the signal, for example, is the received power (RSRP: Reference Signal Received Power) of a downlink reference signal transmitted from the neighboring cell or the serving cell (refer to TS36.214, V8.3.0 for the definition of the RSRP). Note that as the radio quality of the signal, the received quality (RSRQ: Reference Signal Received Quality) of the downlink reference signal, SIR (RS-SIR) of the downlink reference signal, CQI (Channel Quality Indicator), CSI (Channel State Information), and the like may be used instead of the RSRP.

With reference to FIG. 1 and FIG. 2, an example of a handover procedure will be specifically described. In the following description, the received power (RSRP) of a signal is used as the radio quality of a signal.

As illustrated in FIG. 1, in step S1, a mobile station UE measures the received power of signals from a serving cell and a neighboring cell. Furthermore, the mobile station UE may perform cell search together with the measurement in order to detect an undetected neighboring cell. In the present process, the cell search, and the measurement of the radio quality (the received power) of the serving cell and the neighboring cell may be generally called Measurement.

In step S2, the mobile station UE determines whether the received power of the signal from the neighboring cell satisfies Equation 1 below.

$$\text{received power of signal from neighboring cell} + \text{hysteresis} > \text{received power of signal from serving cell} \quad \text{(Equation 1)}$$

When it is determined that Equation 1 is satisfied, the mobile station UE notifies a network of an event A3 for reporting measurement results in step S2.

Specifically, as illustrated in FIG. 2, the mobile station UE measures the received power of signals from a serving cell (a cell A) and a neighboring cell (a cell B) to be monitored, and determines whether to notify the measurement results using "hysteresis [dB]" and "TTT (Time To Trigger) [ms]" notified in advance.

That is, in FIG. 2, when the received power (radio quality) of the signal from the cell B continuously exceeds the received power (radio quality) of the signal from the cell A beyond a predetermined period "TTT" and a "hysteresis", the mobile station UE determines to notify the measurement results (Measurement reports).

Here, the "hysteresis" is a value provided for preventing a handover from the serving cell to the neighboring cell from frequently occurring at a cell boundary, and may have a positive value or a negative value. However, the "hysteresis" is generally set as a negative value.

In step S3, if the network is notified of an event A3, the mobile station UE determines to be handed over to a cell related to the received event A3.

Note that Equation 1 above may be expressed by Equation 2 below. In the case of Equation 2, both the hysteresis and the offset are operated in a hysteresis manner.

$$\text{received power of signal from neighboring cell} - \text{hysteresis} > \text{received power of signal from serving cell} + \text{offset} \quad \text{(Equation 2)}$$

When carrier aggregation is performed, the mobile station UE generally performs the measurement of the received power of the signals from the serving cell and the neighboring cell, or the transmission of the Measurement reports for each component carrier.

CITATION LIST

Non Patent Literature

[NPL 1] 3GPP TS36.913 (V8.0.1)
[NPL 2] 3GPP TS36.300 V8.5.0 (2008-05)

SUMMARY OF THE INVENTION

Technical Problem

As described above, when the carrier aggregation is performed, the measurement of the radio quality of the signals from the serving cell and the neighboring cell, or the transmission of the Measurement reports is performed for each component carrier.

However, when the measurement of the radio quality of the signals from the serving cell and the neighboring cell, or the transmission of the Measurement reports is performed for each component carrier, since the number of Measurement reports is increased by the number of component carriers, overhead of a control signal is increased, resulting in the deterioration of system efficiently.

More specifically, the aforementioned problem will be described with reference to FIG. 3. In FIG. 3, a horizontal axis denotes the position of a mobile station UE and a vertical axis denotes a frequency or a carrier.

That is, in the case in which "the number of component carriers is two" in FIG. 3, upper cells indicate cells (Cell #1-A, Cell #1-B, Cell #1-C, and Cell #1-D) of a component carrier #1, and lower cells indicate cells (Cell #2-A, Cell #2-B, Cell #2-C, and Cell #2-D) of a component carrier #2.

For example, as illustrated in FIG. 3, as compared with the case in which the number of component carriers is one; when the number of component carriers is two, the number of Measurement reports is increased twice.

Furthermore, in general, since a plurality of cells, where carrier aggregation is performed, are confined in the same radio base station, carrier aggregation using a cell from a plurality of radio base stations is not performed.

In this case, there is a problem that when a handover between radio base stations is performed, if the handover is not properly performed, communication quality may deteriorate, or communication quality may not be optimized.

More specifically, in the case in which a handover between radio base stations is performed, since it is necessary to perform a handover in consideration of all component carriers having performed carrier aggregation, when the measurement of the radio quality of a signal and the transmission of the Measurement reports are performed for each component carrier, resulting in a problem that communication quality of other component carriers deteriorates, so that it is difficult to efficiently use a system.

Moreover, more specifically, the aforementioned problem will be described with reference to FIG. 4. In FIG. 4, a horizontal axis denotes the position of a mobile station UE and a vertical axis denotes a frequency or a carrier.

Furthermore, Cell #1-A, Cell #1-B, Cell #2-A, and Cell #2-B belong to a radio base station #a, and Cell #1-C, Cell #1-D, and Cell #2-C belong to a radio base station #b.

In the example illustrated in FIG. 4, since a handover point from the radio base station #a to the radio base station #b regarding a component carrier #1 is a Point 10 and a handover point from the radio base station #a to the radio base station #b regarding a component carrier #2 is a Point 20, handover points between the radio base stations are different from each other at the component carrier #1 and the component carrier #2.

In this case, when the mobile station UE performs a handover (a handover from the Cell #1-B to the Cell #1-C) regarding the component carrier #1 at the Point 10, a connection with the Cell #2-B needs to be released.

In this case, instead of a release of the connection with the Cell #2-B, a connection with the Cell #2-C may be added. However, when the radio quality of the Cell #2-C is not good, communication quality may deteriorate.

Alternatively, instead that the mobile station UE performs the handover (the handover from the Cell #1-B to the Cell #1-C) regarding the component carrier #1 at the Point 10, a connection with the Cell #1-B may be released and the connection with the Cell #2-B may be continued.

However, whether the connection with the Cell #1-B is continued or the connection with the Cell #2-B is released, for example, is to be determined based on radio quality. However, when the measurement of the radio quality of signals from a serving cell and a neighboring cell, or the transmission of Measurement reports is performed for each component carrier, it is difficult to measure the radio quality of a plurality of associated component carriers at a proper timing.

Therefore, the present invention has been achieved in view of the above-described problems, and an object thereof is to provide a mobile station, a radio base station, and a communication control method, by which it is possible to achieve system efficiency and stability of connectivity by efficiently performing a handover at the time of carrier aggregation.

Solution to Problem

A first characteristic of the present embodiment is summarized in that a mobile station, which communicates with a radio base station using two or more carriers, includes: a measurement unit configured to measure the radio quality of a cell during communication or a neighboring cell for each of the two or more carriers; a determination unit configured to determine whether to notify the radio base station of a measurement result regarding each of the two or more carriers in the measurement unit; and a transmission unit configured to transmit the measurement result in the measurement unit to the radio base station when the determination unit determines to notify the radio base station of the measurement result in the measurement unit, wherein the transmission unit is configured to transmit, in addition to the measurement result regarding a carrier in which it is determined by the measurement unit to notify the radio base station of the measurement result in the measurement unit, a measurement result regarding a carrier other than the carrier.

A second characteristic of the present embodiment is summarized in that a radio base station, which communicates with a mobile station using two or more carriers, includes: a measurement instruction unit configured to transmit a control signal for instructing measurement of radio quality of a cell during communication or a neighboring cell to the mobile station; and a reception unit configured to receive a measurement result regarding each of the two or more carriers from the mobile station, wherein the measurement result includes in addition to a measurement result regarding a carrier determined to be notified to the radio base station, a measurement result regarding a carrier other than the carrier.

A third characteristic of the present embodiment is summarized in that a communication control method in a mobile station, which communicates with a radio base station using two or more carriers, includes: a first step of measuring radio quality of a cell during communication or a neighboring cell for each of the two or more carriers; a second step of determining whether to notify the radio base station of a measurement result regarding each of the two or more carriers in the measurement unit; and a third step of transmitting the measurement result in the measurement unit to the radio base station when the determination unit determines to notify the radio base station of the measurement result in the measurement unit, wherein, in the third step, in addition to the measurement result regarding a carrier in which it is determined by the measurement unit to notify the radio base station of the measurement result in the measurement unit, a measurement result regarding a carrier other than the carrier is transmitted.

A fourth characteristic of the present embodiment is summarized in that a communication control method in a radio base station, which communicates with a mobile station using two or more carriers, includes: a first step of transmitting a control signal for instructing measurement of radio quality of a cell during communication or a neighboring cell to the mobile station; and a second step of receiving a measurement result regarding each of the two or more carriers from the mobile station, wherein, in the second step, the measurement result includes, in addition to the measurement result regarding a carrier in which it is determined to be notified to the radio base station, a measurement result regarding a carrier other than the carrier.

A fifth characteristic of the present embodiment is summarized in that a mobile station, which communicates with a radio base station using two or more carriers, includes: a measurement unit configured to measure radio quality of a cell during communication or a neighboring cell for each of the two or more carriers; a reception unit configured to receive a control signal for instructing a handover from the radio base station serving as a handover source; and a transmission unit configured to transmit a control signal for notifying completion of the handover from the radio base station serving as a handover destination, wherein the transmission unit transmits, in addition to the control signal, a measurement result regarding a carrier other than a carrier by which a handover is performed.

Advantageous Effects of Invention

As described above, according to the present invention, it is possible to provide a mobile station, a radio base station, and a communication control method, by which it is possible to achieve system efficiency and stability of connectivity by efficiently performing a handover at the time of carrier aggregation.

BRIEF DESCRIPTION OF DRAWINGS

FIG. 9 is a functional block diagram illustrating a mobile station UE according to the first embodiment of the present invention.

FIG. 10 is a functional block diagram illustrating a radio base station eNB according to the first embodiment of the present invention.

Figure 1:
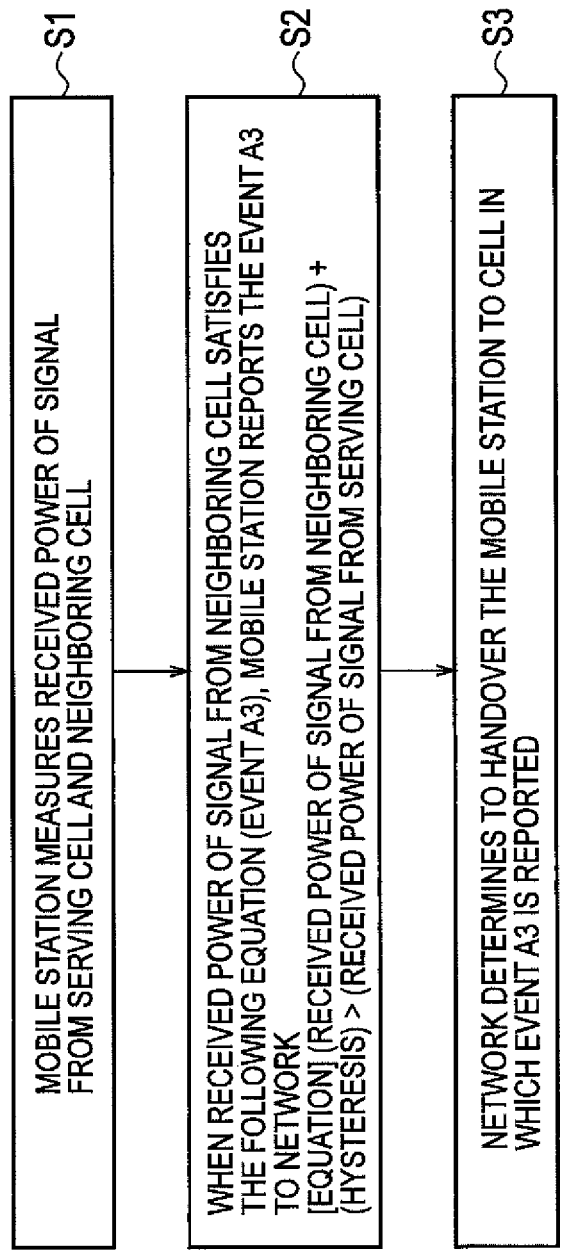
FIG. 1 is a diagram for explaining a conventional mobile communication system.
Figure 2:
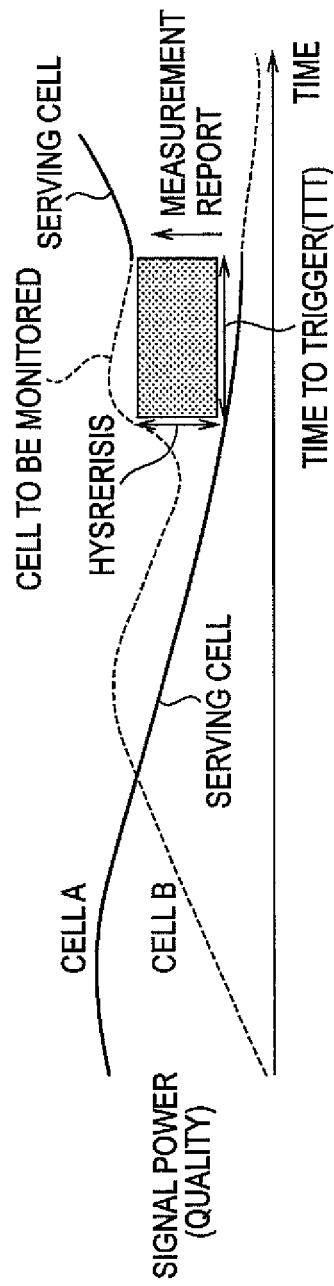
FIG. 2 is a diagram for explaining a conventional mobile communication system.
Figure 3:
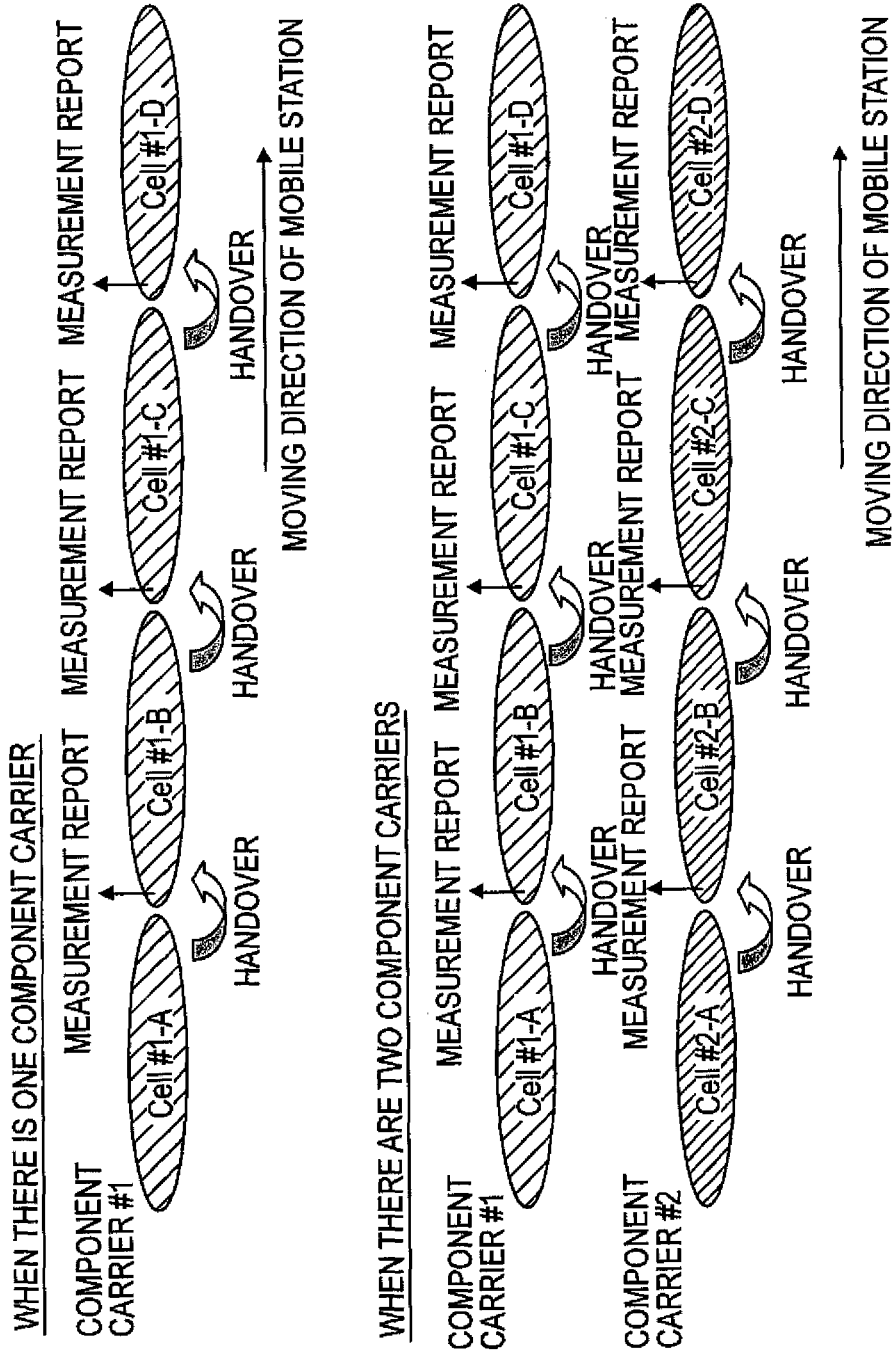
FIG. 3 is a diagram for explaining problems in a conventional mobile communication system.
Figure 4:
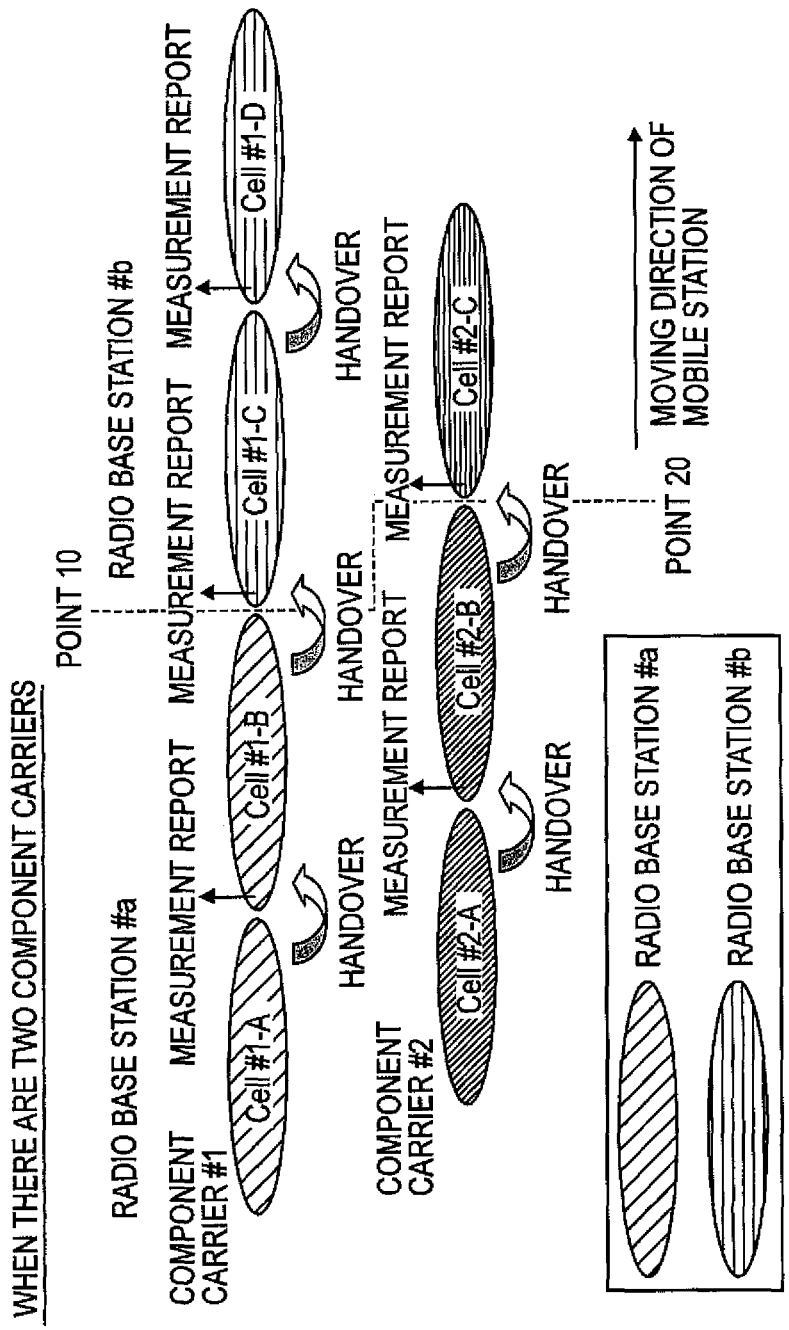
FIG. 4 is a diagram for explaining problems in a conventional mobile communication system.
Figure 5:
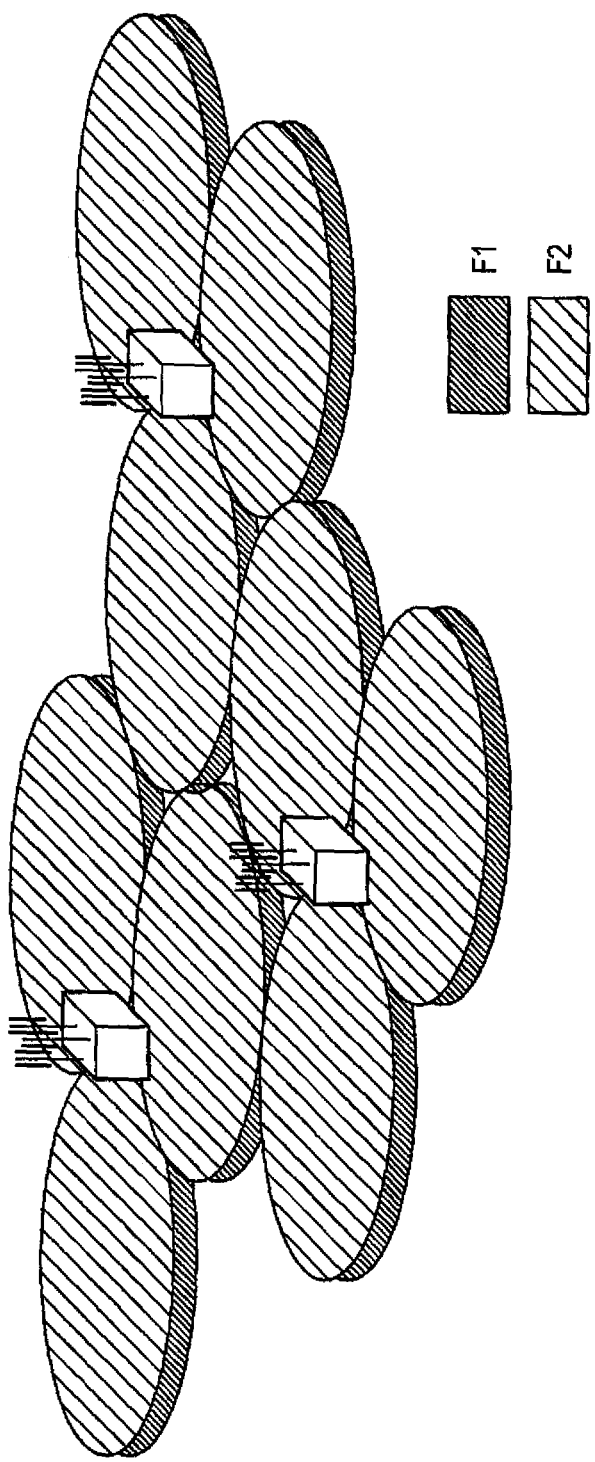
FIG. 5 is a diagram illustrating an example of a configuration of a mobile communication system according to a first embodiment of the present invention.
Figure 6:
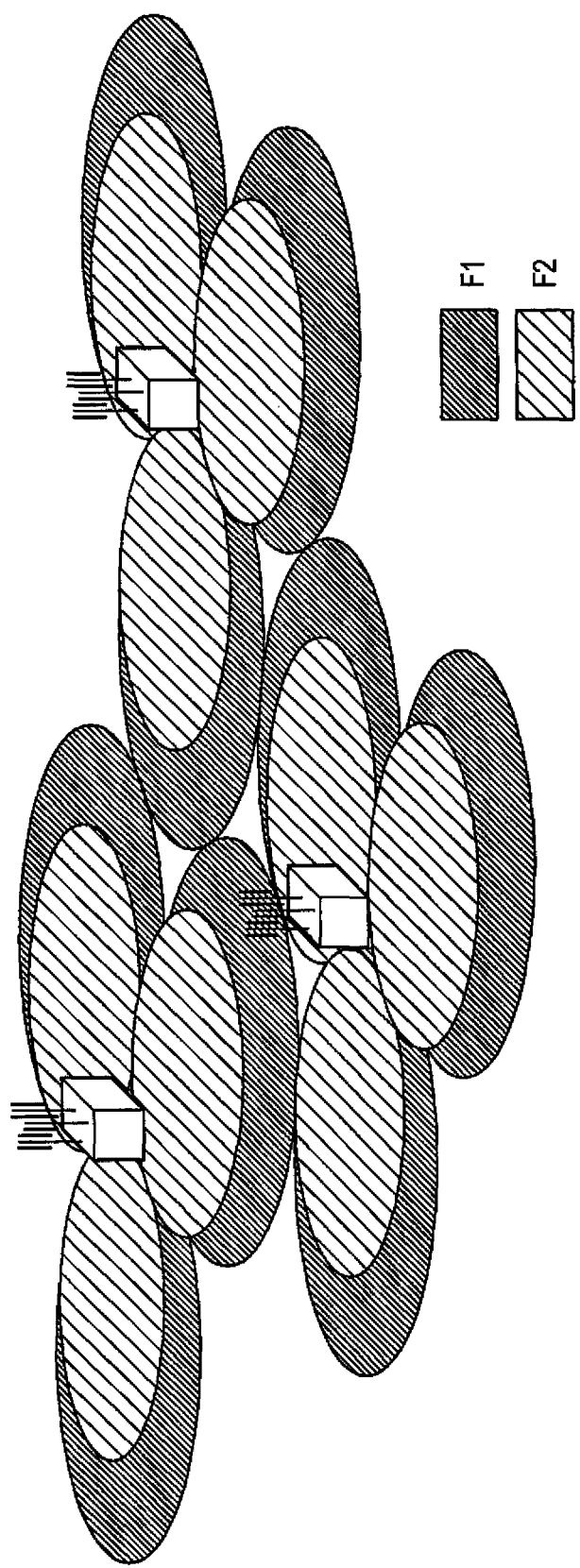
FIG. 6 is a diagram illustrating an example of a configuration of the mobile communication system according to the first embodiment of the present invention.
Figure 7:
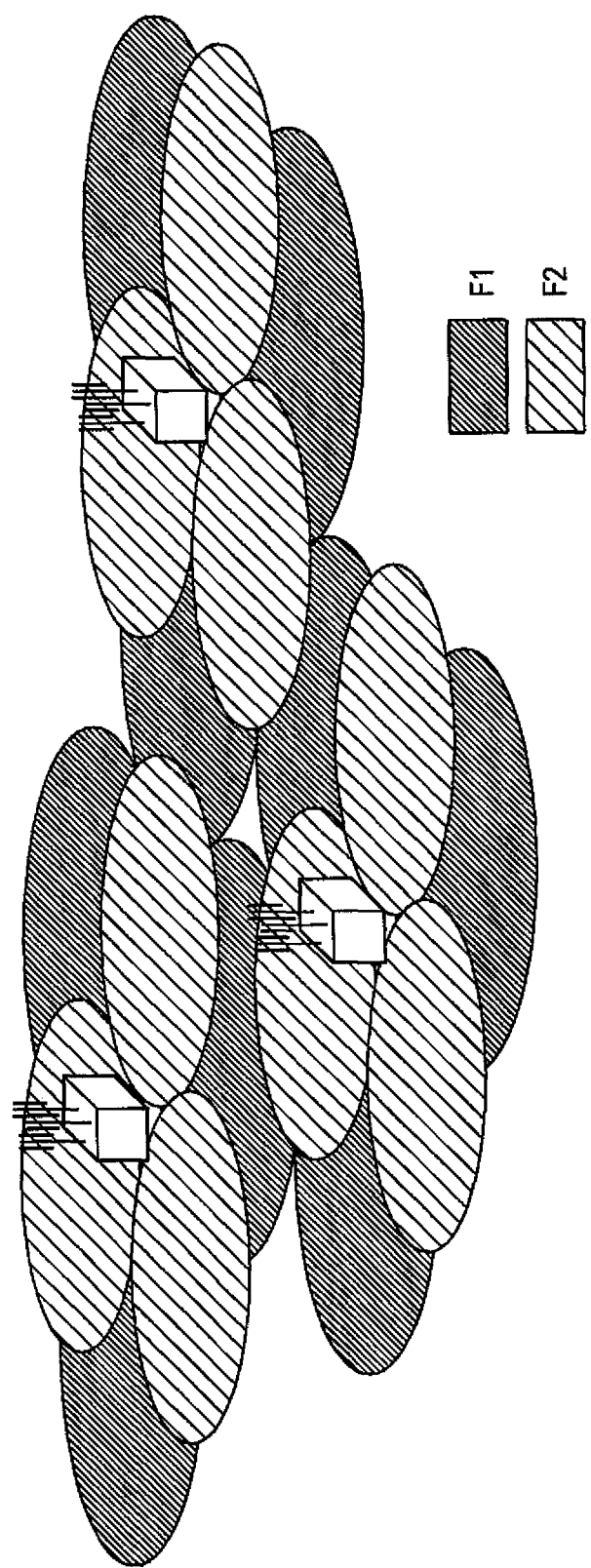
FIG. 7 is a diagram illustrating an example of a configuration of the mobile communication system according to the first embodiment of the present invention.
Figure 8:
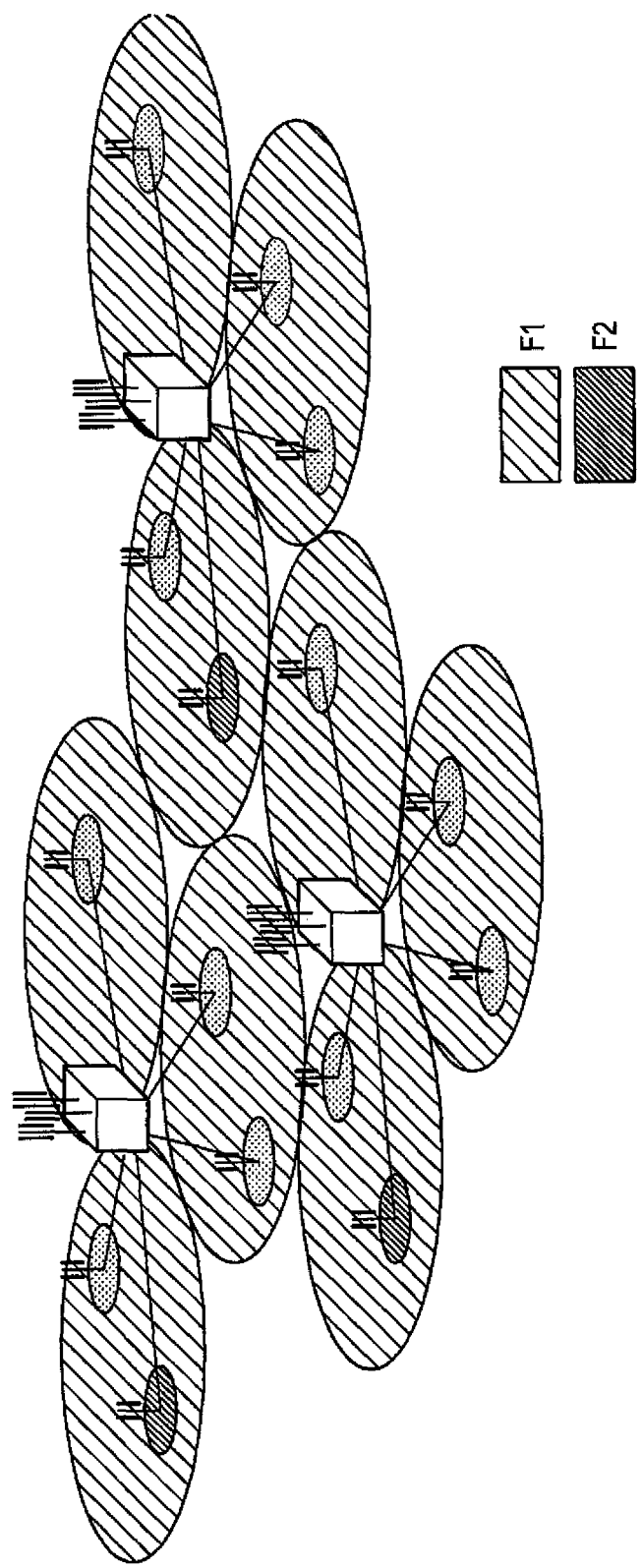
FIG. 8 is a diagram illustrating an example of a configuration of the mobile communication system according to the first embodiment of the present invention.

DESCRIPTION OF EMBODIMENTS (Configuration of Mobile Communication System According to First Embodiment of the Present Invention)

Hereinafter, a mobile communication system according to a first embodiment of the present invention will be described with reference to the accompanying drawings. In all drawings for explaining the present embodiment, the same reference numerals are used to designate elements having the same function, and redundant description will not be repeated.

The mobile communication system according to the present embodiment, for example, is a system employing an LTE-Advanced scheme. That is, the mobile communication system according to the present embodiment includes a radio base station eNB, and a mobile station UE communicating with the radio base station eNB, wherein the mobile station UE and the radio base station eNB perform communication using the LTE-Advanced scheme. Note that the mobile station UE may also be called user equipment.

When the LTE-Advanced scheme is employed, "carrier aggregation" may be employed. That is, in an uplink or a downlink, communication is performed using a plurality of "Component Carriers".

Here, the "Component Carrier" corresponds to one system carrier in an LTE scheme. That is, in the LTE scheme, communication is performed using one "Component Carrier", but in an LTE-Advanced scheme, communication may be performed using two or more "Component Carriers".

As illustrated in FIG. 5 to FIG. 8, in the mobile communication system according to the present embodiment, cells (a first communication area) using a carrier (a component carrier) of an 800 MHz band (a first frequency band F1 in FIG. 5 to FIG. 8) and cells (a second communication area) using a carrier (a component carrier) of a 2 GHz band (a second frequency band F2 in FIG. 5 to FIG. 8) geographically overlap one another. Note that in FIGS. 6, 7, and 8, the cells geographically overlap one another at least in part.

Furthermore, although not illustrated in FIG. 5 to FIG. 8, a third frequency band may exist in addition to the first frequency band and the second frequency band. The third frequency band, for example, may be 1.7 GHz band.

Furthermore, a plurality of component carriers may be set in a certain frequency band. It is not necessary to perform carrier aggregation using all the frequency bands, and carrier aggregation may be performed using a part of the frequency bands. Furthermore, when a plurality of component carriers have been set in a certain frequency band, carrier aggregation may be performed using a part of the component carriers in the frequency band.

In the following description, it is assumed that carrier aggregation is performed using a component carrier (hereinafter, referred to as a first carrier) of the first frequency band and a component carrier (hereinafter, referred to as a second carrier) of the second frequency band.

Furthermore, for a component carrier (hereinafter, referred to as a third carrier) of the third frequency band, carrier aggregation is not performed. However, it is assumed that the mobile station UE performs Measurement of a cell included in the third carrier.

Note that when performing the Measurement of the cell included in the third carrier, for example, the radio quality of the cell of the third carrier is good, it is considered that the mobile station UE performs a handover to the cell, or performs carrier aggregation with respect to the cell.

Note that when the mobile station UE has not been instructed to perform the Measurement of the cell included in the third carrier, the mobile station UE may not perform the Measurement of the cell of the third carrier.

Note that since "F1: 800 MHz" and "F2: 2 GHz" illustrated in FIG. 5 to FIG. 8 are examples, carriers (component carriers) of other frequency bands, for example, a carrier of 3.5 GHz band or a carrier of 2.6 GHz band may be used. Furthermore, three or more carriers may be used as well as two carriers.

Meanwhile, the first frequency band and the second frequency band may be called Frequency Band. A frequency band in the LTE scheme or the LTE-Advanced scheme has been defined in "5.5 Operating bands" of 3GPP TS36.101.

For example, an uplink frequency in Band 1 is 1920 MHz to 1980 MHz and an uplink frequency in Band 19 is 830 MHz to 845 MHz.

In the mobile communication system according to the present embodiment, in a downlink, a "physical downlink shared channel (PDSCH)" shared by mobile stations UEs and a "physical downlink control channel (PDCCH)" are used.

The "physical downlink shared channel (PDSCH)" is used to transmit user data, that is, a normal data signal.

Furthermore, the "physical downlink control channel (PDCCH)" is used to notify a control signal such as information (that is, downlink scheduling information) on an ID of a mobile station UE performing communication using the "physical downlink shared channel (PDSCH)" or a transport format of user data, or information (that is, an uplink scheduling grant) on an ID of a mobile station UE performing communication using a "physical uplink shared channel (PUSCH)" or a transport format of user data.

The "physical downlink control channel (PDCCH)" may be called "downlink L1/L2 control channel". Furthermore, the "downlink scheduling information" or the "uplink scheduling grant" may also be collectively called "downlink control information (DCI)".

Furthermore, in the downlink, broadcast information is transmitted after being mapped to "BCCH: Broadcast Control Channel" serving as a logical channel.

Here, a part of information transmitted through the "BCCH" is mapped to "BCH: Broadcast Channel" serving as a transport channel, and the information mapped to the "BCH" is transmitted to a mobile station UE in a corresponding cell through "P-BCH: Physical Broadcast Channel" serving as a physical channel.

Furthermore, the part of information transmitted through the "BCCH" is mapped to "DL-SCH: Downlink Shared Channel" serving as a transport channel, and the information mapped to the "DL-SCH" is transmitted to the mobile station UE in the corresponding cell through the "physical downlink shared channel (PDSCH)" serving as a physical channel.

In the mobile communication system according to the present embodiment, in an uplink, a "physical uplink shared channel (PUSCH)" shared by mobile stations UEs and a "physical uplink control channel (PUCCH)" are used.

The "physical uplink shared channel (PUSCH)" is used to transmit user data, that is, a normal data signal.

Furthermore, the "physical uplink control channel (PUCCH)" is used to transmit downlink quality information (CQI: Channel Quality Indicator), which is to be used in a scheduling process of the "physical uplink shared channel (PUSCH)" or AMCS (Adaptive Modulation and Coding Scheme), and transmission acknowledgment information (Acknowledgement Information) of the "physical downlink shared channel (PDSCH)".

The downlink quality information may also be called CSI (Channel State Indicator) which is a collective indicator of CQI, PMI (Pre-coding Matrix Indicator), or RI (Rank Indicator).

Furthermore, the content of the transmission acknowledgement information is expressed by any one of a positive response (ACK: Acknowledgement) indicating that a transmission signal has been properly received, and a negative response (NACK: Negative Acknowledgement) indicating that the transmission signal has not been properly received.

As illustrated in FIG. 9, a mobile station UE includes a first carrier measurement unit 102A, a second carrier measurement unit 102B, a third carrier measurement unit 102C, a determination unit 104, a Measurement report transmission unit 106, and a Measurement control signal reception unit 108.

The first carrier measurement unit 102A, the second carrier measurement unit 102B, the third carrier measurement unit 102C, the determination unit 104, the Measurement report transmission unit 106, and the Measurement control signal reception unit 108 are connected to one another.

The first carrier measurement unit 102A, the second carrier measurement unit 102B, and the third carrier measurement unit 102C may be collectively called a carrier measurement unit 102.

The first carrier measurement unit 102A performs Measurement for a cell of the first carrier.

Here, the Measurement indicates cell search of a neighboring cell, and measurement of radio quality of a neighboring cell or a serving cell.

The radio quality, for example, may include RSRP, RSRQ (Reference Signal Received Quality), or SIR of RS (Reference Signal). Alternatively, the radio quality may include CQI (Channel Quality Indicator) or CSI (Channel State Information).

Then, the first carrier measurement unit 102A transmits a measurement result of the radio quality for the cell of the first carrier, that is, the RSRP, the RSRQ, the SIR of the RS and the like to the determination unit 104 and the Measurement report transmission unit 106.

The second carrier measurement unit 102B performs Measurement for a cell of the second carrier. Then, the second carrier measurement unit 102B transmits a measurement result of the radio quality for the cell of the second carrier, that is, the RSRP, the RSRQ, the SIR of the RS and the like to the determination unit 104 and the Measurement report transmission unit 106.

The third carrier measurement unit 102C performs Measurement for a cell of the third carrier. Then, the third carrier measurement unit 102C transmits a measurement result of the radio quality for the cell of the third carrier, that is, the RSRP, the RSRQ, the SIR of the RS and the like to the determination unit 104 and the Measurement report transmission unit 106.

The determination unit 104 receives the measurement result of the radio quality for the cell of the first carrier from the first carrier measurement unit 102A, the measurement result of the radio quality for the cell of the second carrier from the second carrier measurement unit 102B, and the measurement result of the radio quality for the cell of the third carrier from the third carrier measurement unit 102C.

Then, the determination unit 104 determines whether to transmit a Measurement report for the first carrier.

Hereinafter, a description will be provided for an example of a process in which the determination unit 104 determines whether to transmit the Measurement report. Note that in the following example, as the radio quality of a neighboring cell or a serving cell, the received power of a signal from the cell, that is, RSRP is measured.

For example, the determination unit 104 may perform determination of an event A3 for the first carrier. That is, the determination unit 104 may determine whether the received power (RSRP) of the signal from the neighboring cell satisfies Equation 3 below, and determine to notify a radio base station eNB of a measurement result of the event A3 as a Measurement report when it is determined that Equation 3 is satisfied.

$$\text{received power of signal from neighboring cell} + \text{hysteresis} > \text{received power of signal from serving cell} \quad \text{(Equation 3)}$$

When it is determined to notify the radio base station eNB of the Measurement report, the determination unit 104 notifies the Measurement report transmission unit 106 of the determination result.

Note that an operation for "determining to notify the radio base station eNB of the Measurement report" may be replaced with an expression "an event (the event A3 in this case) is triggered".

Alternatively, for example, the determination unit 104 may perform determination of an event A1 for the first carrier. That is, the determination unit 104 may determine whether the received power of the signal from the serving cell satisfies Equation 4 below, and determine to notify the radio base station eNB of a measurement result of the event A1 as a Measurement report when it is determined that Equation 4 is satisfied.

$$\text{received power of signal from serving cell} > \text{first threshold value} \quad \text{(Equation 4)}$$

When it is determined to notify the radio base station eNB of the Measurement report, the determination unit 104 notifies the Measurement report transmission unit 106 of the determination result.

Note that an operation for "determining to notify the radio base station eNB of the Measurement report" may be replaced with an expression "an event (the event A1 in this case) is triggered".

Alternatively, for example, the determination unit 104 may perform determination of an event A2 for the first carrier. That is, the determination unit 104 may determine whether the received power of the signal from the serving cell satisfies Equation 5 below, and determine to notify the radio base station eNB of a measurement result of the event A2 as a Measurement report when it is determined that Equation 5 is satisfied.

$$\text{received power of signal from serving cell} < \text{second threshold value} \quad \text{(Equation 5)}$$

When it is determined to notify the radio base station eNB of the Measurement report, the determination unit 104 notifies the Measurement report transmission unit 106 of the determination result.

Note that an operation for "determining to notify the radio base station eNB of the Measurement report" may be replaced with an expression "an event (the event A2 in this case) is triggered".

Alternatively, for example, the determination unit 104 may perform determination of an event A4 for the first carrier. That is, the determination unit 104 may determine whether the received power of the signal from the serving cell satisfies Equation 6 below, and determine to notify the radio base station eNB of a measurement result of the event A4 as a Measurement report when it is determined that Equation 6 is satisfied.

$$\text{received power of signal from neighboring cell} > \text{fifth threshold value} \quad \text{(Equation 6)}$$

When it is determined to notify the radio base station eNB of the Measurement report, the determination unit 104 notifies the Measurement report transmission unit 106 of the determination result.

Note that an operation for "determining to notify the radio base station eNB of the Measurement report" may be replaced with an expression "an event (the event A4 in this case) is triggered".

Alternatively, for example, the determination unit 104 may perform determination of an event A5 for the first carrier. That is, the determination unit 104 may determine whether the received power of the signal from the serving cell and the received power of the signal from the neighboring cell satisfy Equation 7 below, and determine to notify the radio base station eNB of a measurement result of the event A5 as a Measurement report when it is determined that Equation 7 is satisfied.

$$\text{received power of signal from serving cell} < \text{third threshold value and received power of signal from neighboring cell} > \text{fourth threshold value} \quad \text{(Equation 7)}$$

When it is determined to notify the radio base station eNB of the Measurement report, the determination unit 104 notifies the Measurement report transmission unit 106 of the determination result.

Note that an operation for "determining to notify the radio base station eNB of the Measurement report" may be replaced with an expression "an event (the event A5 in this case) is triggered".

Here, instead of the events A1 to A5, the determination unit 104 may determine whether to transmit Measurement reports for events other than the events A1 to A5, that is, events B1, B2 and the like.

Alternatively, the determination unit 104 may also perform determination of other events, and determine whether to transmit Measurement reports for the events.

Furthermore, the determination unit 104 may also determine to periodically transmit the Measurement report. That is, the determination unit 104 may also instruct the Measurement report transmission unit 106 to periodically transmit the Measurement report.

Alternatively, the determination unit 104 may also perform determination of the transmission of the Measurement report based on the determination of the event as described above, and determine to periodically transmit other Measurement reports starting from a transmission timing of the Measurement report.

That is, the determination unit 104 may also instruct the Measurement report transmission unit 106 to transmit the Measurement report based on the determination of the event as described above, and instruct the Measurement report transmission unit 106 to periodically transmit other Measurement reports starting from the transmission timing of the Measurement report.

Furthermore, the determination unit 104 determines whether to transmit a Measurement report for the second carrier, and notifies the Measurement report transmission unit 106 of a determination result.

Note that since process for determining whether to transmit the Measurement report regarding the second carrier and notifying the Measurement report transmission unit 106 of the determination result are equal to the processes for the first carrier, a description thereof will not be repeated.

Furthermore, the determination unit 104 determines whether to transmit a Measurement report for the third carrier, and notifies the Measurement report transmission unit 106 of a determination result.

Note that since process for determining whether to transmit the Measurement report for the third carrier and notifying the Measurement report transmission unit 106 of the determination result are equal to the processes for the first carrier, a description thereof will not be repeated.

Note that in the aforementioned example, the determination unit 104 determines whether to transmit a Measurement report for one carrier. However, instead, the determination unit 104 may determine whether to transmit Measurement reports for two or more carriers.

The Measurement report transmission unit 106 receives the measurement result of the radio quality for the cell of the first carrier, the measurement result of the radio quality for the cell of the second carrier, and the measurement result of the radio quality for the cell of the third carrier from the first carrier measurement unit 102A, the second carrier measurement unit 102B, and the third carrier measurement unit 102C, respectively.

Furthermore, the Measurement report transmission unit 106 receives the determination result regarding whether to transmit the Measurement report for the first carrier, the second carrier, or the third carrier from the determination unit 104.

Then, the Measurement report transmission unit 106 transmits the Measurement report to the radio base station eNB based on the determination result regarding whether to transmit the Measurement report for the first carrier, which has been received from the determination unit 104.

Furthermore, the Measurement report transmission unit 106 transmits the Measurement report to the radio base station eNB based on the determination result regarding whether to transmit the Measurement report regarding the second carrier, which has been received from the determination unit 104.

Furthermore, the Measurement report transmission unit 106 transmits the Measurement report to the radio base station eNB based on the determination result regarding whether to transmit the Measurement report for the third carrier, which has been received from the determination unit 104.

Note that in the aforementioned example, the Measurement report transmission unit 106 transmits a Measurement report for one carrier. However, instead, the Measurement report transmission unit 106 may transmit Measurement reports for a plurality of carriers.

Here, when transmitting a corresponding Measurement report, the Measurement report transmission unit 106 may allow a measurement result of radio quality regarding a carrier other than a carrier in which the determination unit 104 has determined to notify the radio base station eNB of a Measurement report to be included in the corresponding Measurement report.

That is, when transmitting a corresponding Measurement report, the Measurement report transmission unit 106 may allow the measurement result of radio quality regarding the carrier, which is different from the carrier in which the determination unit 104 has determined to notify the radio base station eNB of the Measurement report to be included in the corresponding Measurement report.

In other words, the corresponding Measurement report may include the measurement result of the radio quality regarding the carrier different from the carrier in which the determination unit 104 has determined to notify the radio base station eNB of the Measurement report.

For example, when transmitting the Measurement report for the first carrier, the Measurement report transmission unit 106 may allow the measurement result of the radio quality for the second carrier to be included in the Measurement report.

Alternatively, when transmitting the Measurement report for the first carrier, the Measurement report transmission unit 106 may allow the measurement results of the radio quality for the second carrier and the third carrier to be included in the Measurement report.

Here, the measurement result regarding the carrier (hereinafter, referred to as another carrier), other than the carrier in which the determination unit 104 has determined to notify the radio base station eNB of the Measurement report, may include the ID and radio quality of a cell with good radio quality in the other carrier.

Here, the number of cells with good radio quality may be one or two or more. When two or more cells with good radio quality are notified, the cells may be notified in an ascending order of radio quality.

That is, when upper four cells with good radio quality are notified, the IDs and radio quality of the four cells may be notified in an ascending order of radio quality.

Note that when the other carrier exists in a plural number, the four cells may be four cells of one carrier, or may be four cells of all the carriers.

Alternatively, when the other carrier exists in a plural number, the four cells may be four cells of some of the carriers.

Alternatively, the measurement result regarding the carrier (hereinafter, referred to as another carrier), other than the carrier in which the determination unit 104 has determined to notify the radio base station eNB of the Measurement report, may specifically include a cell, where carrier aggregation is performed in the other carrier, and radio quality of the cell.

Note that the cell, where the carrier aggregation is performed, may be a cell where a link (a connection) has been established between the mobile station UE and the radio base station eNB. That is, the cell, where the carrier aggregation is performed, may be a cell during communication of a carrier by which the carrier aggregation is performed.

Alternatively, the measurement result regarding the carrier (hereinafter, referred to as another carrier), other than the carrier in which the determination unit 104 has determined to notify the radio base station eNB of the Measurement report, may specifically include a measurement result regarding a carrier by which carrier aggregation is performed. Note that when the carrier by which carrier aggregation is performed exists in a plural number, the other carrier may correspond to the whole or a part of the carriers.

Alternatively, the measurement result regarding the carrier (hereinafter, referred to as another carrier), other than the carrier in which the determination unit 104 has determined to notify the radio base station eNB of the Measurement report, may specifically include a cell, where carrier aggregation is performed in the other carrier, radio quality of the cell, and the ID and ratio quality of a cell with good radio quality.

Here, the number of cells with good radio quality may be one or two or more. When two or more cells with good radio quality are notified, the cells may be notified in an ascending order of radio quality.

The ID of the cell may include Physical Cell ID (PCI). The radio quality may include RSRP, RSRQ, or SIR of RS. Alternatively, the radio quality may include CQI or CSI.

Furthermore, the number of cells with good radio quality in the other carrier may be designated to the mobile station UE from the radio base station eNB. The number of cells with good radio quality in the other carrier may be notified to the mobile station UE by the radio base station eNB via the Measurement control signal reception unit 108.

The radio base station eNB designates the number of cells with good radio quality to the mobile station UE, so that unnecessary cell information is reduced, resulting in a reduction of overhead of a control signal (Measurement report).

Furthermore, the other carrier may be designated to the mobile station UE from the radio base station eNB. For example, identification information of the other carrier may be notified to the mobile station UE by the radio base station eNB via the Measurement control signal reception unit 108.

For example, when the Measurement report for the first carrier is transmitted, the radio base station eNB may instruct the mobile station UE such that the Measurement report includes the measurement result of the radio quality for the second carrier.

Here, the second carrier corresponds to the other carrier. Alternatively, when the Measurement report for the first carrier is transmitted, the radio base station eNB may instruct the mobile station UE such that the Measurement report includes the measurement results of the radio quality for the second carrier and the third carrier. Here, the second carrier and the third carrier correspond to the other carrier.

Note that in relation to the cell during communication of the carrier by which the carrier aggregation is performed, the ID and radio quality of the cell may be included in the Measurement report, regardless of an instruction from the radio base station eNB.

Furthermore, in relation to the carrier (a component carrier) by which the carrier aggregation is performed, the ID and ratio quality of a cell with good radio quality in the carrier may be included in the Measurement report, regardless of an instruction from the radio base station eNB.

The radio base station eNB designates the other carrier to the mobile station UE, thereby efficiently acquiring a desired measurement result of the radio quality for a carrier.

That is, instead of measurement results of radio quality for many carriers, the measurement result of the radio quality for a carrier desired by the radio base station eNB is notified by the mobile station UE, resulting in a reduction of overhead of a control signal (Measurement report).

Note that the other carrier may be either a carrier by which carrier aggregation is performed or a carrier by which the carrier aggregation is not performed, or both the carrier by which the carrier aggregation is performed and the carrier by which the carrier aggregation is not performed.

For example, the carrier by which the carrier aggregation is performed is the first carrier and the second carrier in the aforementioned example, and the carrier by which the carrier aggregation is not performed is the third carrier in the aforementioned example. Furthermore, the other carrier may be included in carriers for which the radio base station eNB instructs the mobile station UE to performs Measurement.

Note that the Measurement report is transmitted from the mobile station UE to the radio base station eNB as an uplink data signal.

More specifically, the uplink data signal may include DCCH in terms of a logical channel. Furthermore, the Measurement report may be transmitted from the mobile station UE to the radio base station eNB using the first carrier. Alternatively, the Measurement report may be transmitted from the mobile station UE to the radio base station eNB using the second carrier.

Alternatively, the Measurement report may be transmitted from the mobile station UE to the radio base station eNB using both the first carrier and the second carrier.

As described above, when the Measurement report transmission unit 106 transmits a corresponding Measurement report, the measurement result of the radio quality for the carrier, other than the carrier in which the determination unit 104 has determined to notify the radio base station eNB of the Measurement report is included in the corresponding Measurement report, so that it is possible for the radio base station eNB to instruct the mobile station UE to perform a handover at a more proper timing in consideration of the states of a plurality of carriers, and an increase in throughput and stability of Mobility characteristics are achieved, resulting in the achievement of system efficiency and stability of connectivity.

Note that as described above, when the Measurement report transmission unit 106 transmits a Measurement report including the measurement result of the radio quality for the carrier (another carrier), other than the carrier in which the determination unit 104 has determined to notify the radio base station eNB of the Measurement report, Time-to-trigger for the other carrier may be reset.

That is, when the Time-to-trigger has been activated, the Measurement report transmission unit 106 may allow the Time-to-trigger to have an initial value.

That is, when the Time-to-trigger has been activated, the Measurement report transmission unit 106 may allow the Time-to-trigger to have a value of 0.

Furthermore, as described above, when the Measurement report transmission unit 106 transmits a corresponding Measurement report including the measurement result of the radio quality for the carrier (another carrier), other than the carrier in which the determination unit 104 has determined to notify the radio base station eNB of the Measurement report, the Measurement report transmission unit 106 may periodically transmit a Measurement report for the other carrier starting from the transmission timing of the corresponding Measurement report including the measurement result.

The reset of the Time-to-trigger or the periodical transmission of the Measurement report is performed, so that the transmission of the Measurement report for the other carrier is reduced, resulting in a reduction of overhead due to the Measurement report.

The Measurement control signal reception unit 108 receives a control signal associated with the Measurement from the radio base station eNB, and notifies the first carrier measurement unit 102A, the second carrier measurement unit 102B, the third carrier measurement unit 102C, the determination unit 104, and the Measurement report transmission unit 106 of information included in the control signal.

For example, the Measurement control signal reception unit 108 may receive the number of cells with good radio quality in the other carrier from the radio base station eNB, and notify the Measurement report transmission unit 106 of the received information.

Furthermore, the Measurement control signal reception unit 108, for example, may receive the identification information of the other carrier from the radio base station eNB, and notify the Measurement report transmission unit 106 of the received identification information.

As illustrated in FIG. 10, the radio base station eNB includes a Measurement control signal transmission unit 202, a Measurement report reception unit 204, and a handover control unit 206. The Measurement control signal transmission unit 202, the Measurement report reception unit 204, and the handover control unit 206 are connected to one another.

The Measurement control signal transmission unit 202 transmits the control signal associated with the Measurement to the mobile station UE.

The control signal may include identification information (ID) of a carrier for which Measurement is performed, a measurement bandwidth, identification information of an event, the presence or absence of the periodical transmission of a Measurement report, hysteresis or TTT used in the determination of an event, and the like. The mobile station UE performs a process of the Measurement for a carrier designated by the control signal.

Furthermore, the Measurement control signal transmission unit 202 may transmit the number of cells with good radio quality in the other carrier to the mobile station UE as a part of the information included in the control signal.

Furthermore, the Measurement control signal transmission unit 202 may designate the other carrier to the mobile station UE. That is, the Measurement control signal transmission unit 202 may transmit the identification information of the other carrier to the mobile station UE.

The Measurement report reception unit 204 receives a Measurement report transmitted by the mobile station UE.

Here, as described above, the Measurement report may include the measurement result of the radio quality for the carrier (another carrier), other than the carrier in which it is determined in the mobile station UE to transmit the Measurement report to the radio base station eNB.

Note that a description for the measurement result of the radio quality for the other carrier, which is included in the Measurement report, will not be repeated in order to avoid redundancy with the description for the mobile station UE.

The Measurement report reception unit 204 notifies the handover control unit 206 of the Measurement report notified by the mobile station UE.

The handover control unit 206 receives the Measurement report notified by the mobile station UE through the Measurement report reception unit 204.

As described above, the Measurement report may include the measurement result of the radio quality for the carrier (another carrier), other than the carrier in which it is determined in the mobile station UE to transmit the Measurement report to the radio base station eNB.

The handover control unit 206 determines whether to instruct the mobile station UE to perform a handover based on the Measurement report, and transmits a control signal (a handover command) for instructing a handover to the mobile station UE when it is determined to instruct the mobile station UE to perform a handover.

Here, the handover control unit 206, for example, may determine whether to perform a handover based on information on the carrier (another carrier), other than the carrier in which it is determined in the mobile station UE to transmit the Measurement report to the radio base station eNB, in addition to information on the carrier in which it is determined in the mobile station UE to transmit the Measurement report to the radio base station eNB, which is included in the Measurement report.

For example, when a handover destination candidate cell designated by a corresponding Measurement report belongs to the same base station as in a current serving cell, the handover control unit 206 instructs the mobile station UE to perform a handover based on the corresponding Measurement report.

That is, the handover control unit 206 instructs the mobile station UE to be handed over to the handover destination candidate cell designated by the corresponding Measurement report.

Furthermore, for example, when the handover destination candidate cell designated by the corresponding Measurement report belongs to a base station different from that of the current serving cell, the handover control unit 206 determines whether to instruct the mobile station UE to perform a handover based on the measurement result of the radio quality for the carrier in which it is determined in the mobile station UE to transmit the Measurement report to the radio base station eNB, and the measurement result of the radio quality for the other carrier.

Then, when it is determined to instruct a handover through the aforementioned determination, the handover control unit 206 instructs the mobile station UE to perform a handover.

Hereinafter, a detailed operation of the handover control unit 206 will be described.

For example, the handover control unit 206 may determine whether to perform a handover based on the radio quality of the handover destination candidate cell designated by a corresponding Measurement report, and the radio quality of a cell during communication through carrier aggregation in the other carrier.

That is, when the radio quality of the handover destination candidate cell designated by the corresponding Measurement report is superior to the radio quality of the cell during communication through carrier aggregation in the other carrier, the handover control unit 206 may determine to perform a handover. In other cases, the handover control unit 206 may determine not to perform a handover.

Furthermore, the handover control unit 206, for example, may determine whether to perform a handover based on the radio quality of a cell with a good radio quality in the carrier in which it is determined in the mobile station UE to transmit the Measurement report to the radio base station eNB, and the radio quality of a cell with a good radio quality in the other carrier.

Furthermore, the handover control unit 206, for example, may determine whether to delete the other carrier from carriers, by which carrier aggregation is performed, based on the radio quality of the cell with a good radio quality in the carrier in which it is determined in the mobile station UE to transmit the Measurement report to the radio base station eNB, and the radio quality of the cell with a good radio quality in the other carrier.

Furthermore, the handover control unit 206, for example, may determine whether to delete the carrier in which it is determined in the mobile station UE to transmit the Measurement report to the radio base station eNB from the carriers, by which the carrier aggregation is performed, based on the radio quality of the cell with a good radio quality in the carrier in which it is determined in the mobile station UE to transmit the Measurement report to the radio base station eNB, and the radio quality of the cell with a good radio quality in the other carrier.

Furthermore, the handover control unit 206, for example, may determine whether to added the other carrier to the carriers, by which the carrier aggregation is performed, based on the radio quality of the cell with a good radio quality in the carrier in which it is determined in the mobile station UE to transmit the Measurement report to the radio base station eNB, and the radio quality of the cell with a good radio quality in the other carrier.

Figure 11:
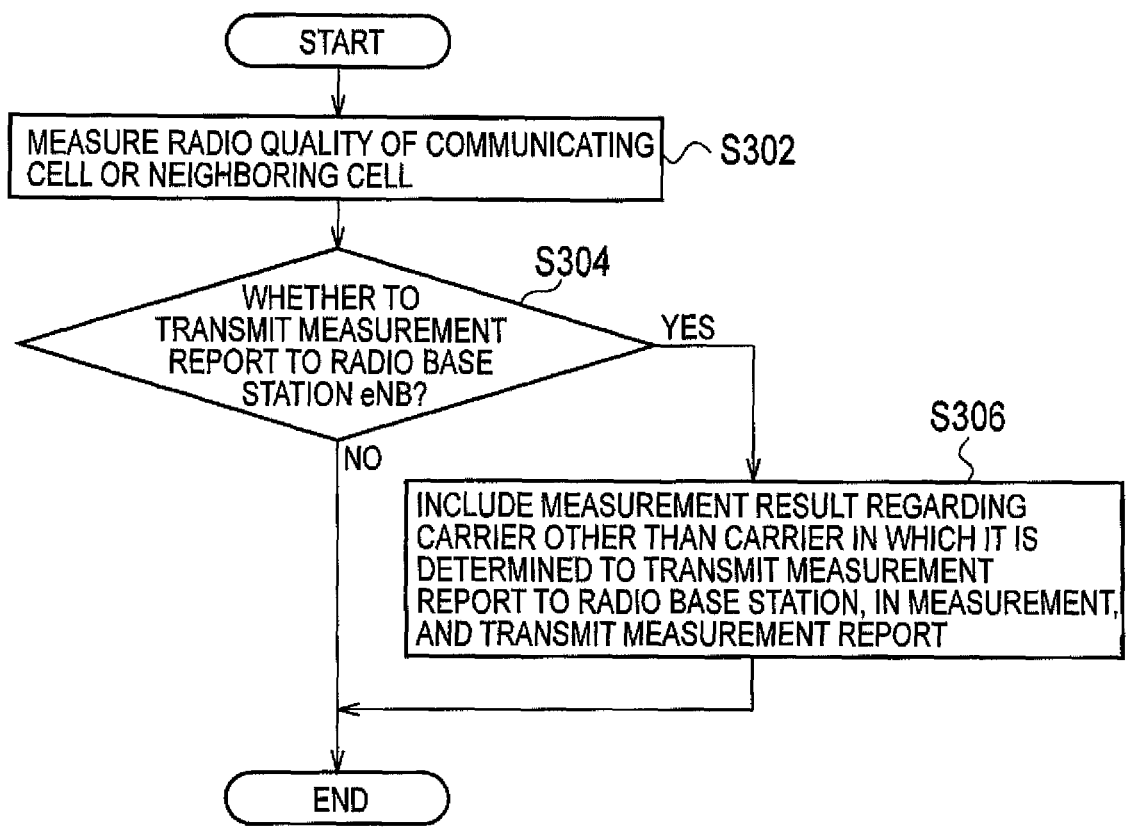
FIG. 11 is a flowchart illustrating a communication control method in the mobile station UE of the first embodiment of the present invention.

With reference to FIG. 11, a communication control method in the mobile station UE according to the present invention will be described.

In step S302, the mobile station UE measures the radio quality of a cell during communication or a neighboring cell for two or more carriers. Note that the mobile station UE performs Measurement for the two or more carriers according to an instruction of the radio base station eNB.

In step S304, the mobile station UE (the determination unit 104) determines whether to transmit a Measurement report for each of the two or more carriers.

Note that as described above, the transmission of the Measurement report may be triggered by the events (the events A1, A2 and the like) designated by the radio base station eNB, or the Measurement report may be periodically transmitted.

When the mobile station UE determines to transmit the Measurement report (step S304: YES), the mobile station UE transmits a measurement report, being included in Measurement, regarding the carrier (another carrier), other than the carrier in which it is determined to transmit the Measurement report to the radio base station, in step S306.

Furthermore, when it is determined not to transmit the Measurement report (step S304: NO), the mobile station UE completes the process.

Note that in the Measurement instruction from the radio base station eNB to the mobile station UE, the identification information of the other carrier or the number of cells included in the measurement result regarding the other carrier may be designated to the mobile station UE by the radio base station eNB.

Figure 12:
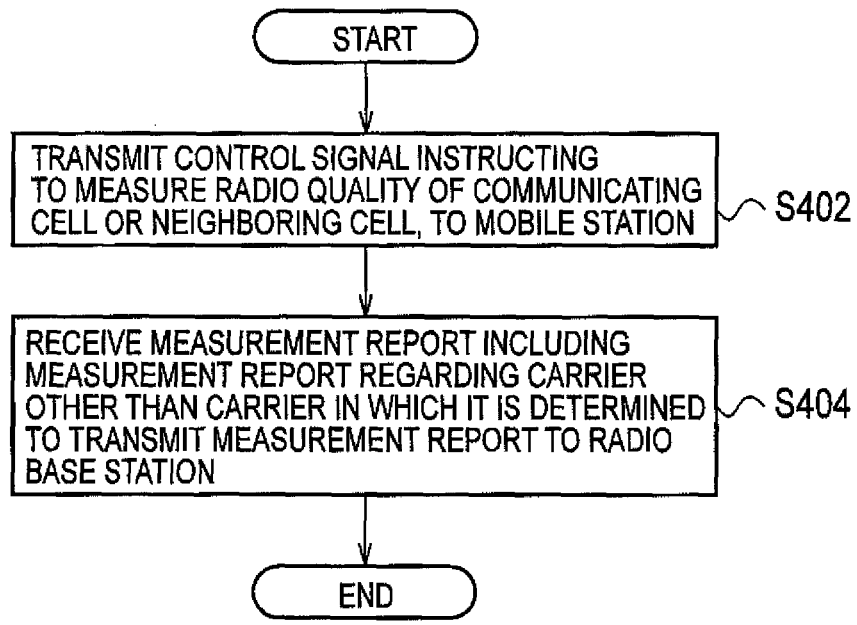
FIG. 12 is a flowchart illustrating a communication control method in the radio base station eNB of the first embodiment of the present invention.

With reference to FIG. 12, a communication control method in the radio base station eNB according to the present invention will be described.

In step S402, the radio base station eNB instructs the mobile station UE to measure (to perform Measurement for) the radio quality of a cell during communication or a neighboring cell. Note that the radio base station eNB may instruct the mobile station UE to perform Measurement for two or more carriers.

In step S404, the radio base station eNB receives a Measurement report transmitted by the mobile station UE. Here, the Measurement report may include the measurement result regarding the carrier (another carrier), other than the carrier in which it is determined in the mobile station UE to transmit the Measurement report to the radio base station.

That is, the radio base station eNB receives the Measurement report including the measurement result regarding the carrier, other than the carrier in which it is determined in the mobile station UE to transmit the Measurement report to the radio base station.

Note that in the Measurement instruction from the radio base station eNB to the mobile station UE in step S402, the radio base station eNB may designate the identification information of the other carrier or the number of cells, which is included in the measurement result regarding the other carrier, to the mobile station UE.

Hereinafter, a description will be provided for effects when the mobile station UE allows a Measurement report to include the measurement result regarding the carrier (another carrier), other than the carrier in which it is determined to transmit the Measurement report to the radio base station.

For example, the effects will be described with reference to FIG. 13.

Figure 13:
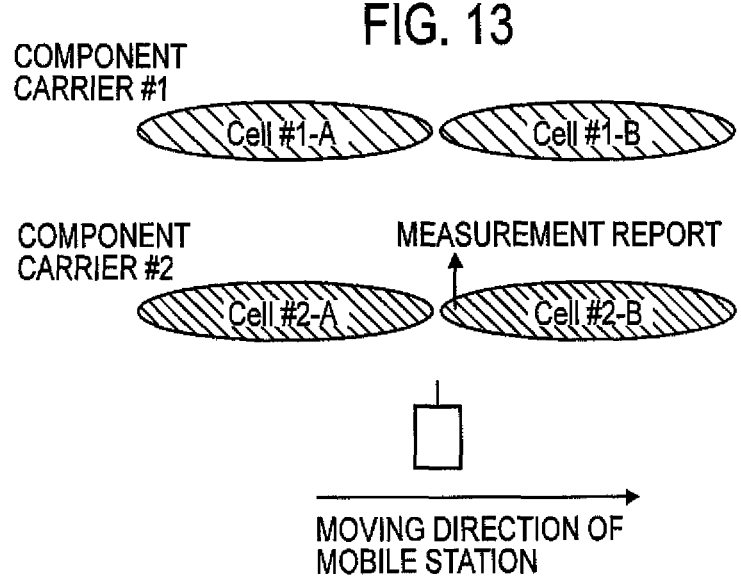
FIG. 13 is a diagram for explaining effects of the first embodiment of the present invention.

In FIG. 13, a horizontal axis denotes the position of the mobile station UE and a vertical axis denotes a frequency or a carrier. Furthermore, in FIG. 13, the mobile station UE performs carrier aggregation with Cell #1-A and Cell #2-A.

Furthermore, in order to move from the left direction to the right direction of FIG. 13, the mobile station UE is assumed to be handed over to Cell #1-B and Cell #2-B from the Cell #1-A and the Cell #2-A in the near future.

Here, when a Measurement report for a component carrier #2 is transmitted, the mobile station UE according to the present invention notifies a measurement result of the radio quality in a component carrier #1 to the Measurement report.

Note that in the aforementioned example, it is assumed that a Measurement report for the component carrier #1 is not yet transmitted.

In this case, when instructing a handover (a handover to the Cell #2-B from the Cell #2-A) for the component carrier #2, it is also possible for the radio base station eNB to simultaneously instruct a handover (a handover to the Cell #1-B from the Cell #1-A) for the component carrier #1 based on the measurement result of the radio quality in the component carrier #1.

When there is no measurement result of the radio quality in the component carrier #1, since it is not possible to determine whether the handover to the Cell #1-B from the Cell #1-A is proper, it is not possible for the radio base station eNB to perform the aforementioned process.

As a consequence, the measurement report for the component carrier #1 is not necessary for the mobile station UE according to the present invention, resulting in a reduction of overhead of a control signal.

Alternatively, for example, the effects will be described with reference to FIG. 14.

Figure 14:
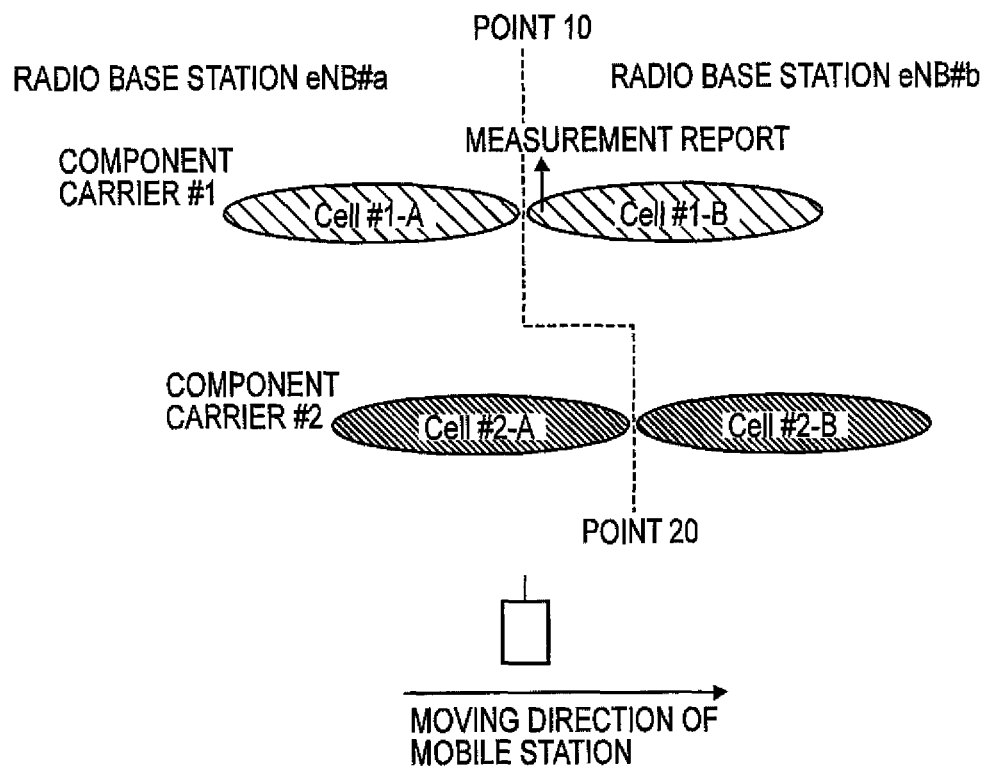
FIG. 14 is a diagram for explaining effects of the first embodiment of the present invention.

In FIG. 14, a horizontal axis denotes the position of the mobile station UE and a vertical axis denotes a frequency or a carrier. Furthermore, in FIG. 14, the mobile station UE performs carrier aggregation with Cell #1-A and Cell #1-B. Furthermore, the Cell #1-A and Cell #2-A belong to a radio base station eNB #a, and the Cell #1-B and Cell #2-B belong to a radio base station eNB #b.

Furthermore, it is assumed that in order to move from the left direction to the right direction of FIG. 14, the mobile station UE is handed over to the Cell #1-B and the Cell #2-B from the Cell #1-A and the Cell #2-A in the near future.

However, in FIG. 14, a point (a point 10) at which a handover to the Cell #1-B from the Cell #1-A is performed is geographically different from a point (a point 20) at which a handover to the Cell #2-B from the Cell #2-A is performed.

Here, when a Measurement report for a component carrier #1 is transmitted, the mobile station UE according to the present invention notifies a measurement result of the radio quality in a component carrier #2 to the Measurement report.

Note that in the aforementioned example, it is assumed that a Measurement report for the component carrier #2 is not yet transmitted.

In this case, it is possible for the radio base station eNB to perform various types of determination based on the measurement result of the radio quality in the component carrier #2, and to perform control based on the determination.

For example, when the radio quality of the Cell #2-A is very good in the measurement result of the radio quality in the component carrier #2, the radio base station eNB may perform a process for deleting the Cell #1-A from a list of cells during communication through carrier aggregation without instructing the handover to the Cell #1-B from the Cell #1-A.

This is because the handover to the Cell #1-B from the Cell #1-A is a handover between radio base stations and thus the Cell #2-A is needed to be deleted, but continuing communication with the Cell #2-A is advantageous in terms of communication quality as compared with the case in which the handover to the Cell #1-B from the Cell #1-A is performed.

Note that the advantage in terms of the communication quality, for example, may represent high throughput, or stability of connectivity in terms of Mobility characteristics.

For example, when the radio quality of the Cell #2-A is poor in the measurement result of the radio quality in the component carrier #2, the radio base station eNB may perform a process for instructing the handover to the Cell #1-B from the Cell #1-A and deleting the Cell #2-A from the list of the cells during communication through the carrier aggregation.

This is because the handover to the Cell #1-B from the Cell #1-A is a handover between radio base stations and thus the Cell #2-A is needed to be deleted, and performing the handover to the Cell #1-B from the Cell #1-A is advantageous in terms of the communication quality as compared with the case in which the communication with the Cell #2-A is continued.

Note that the advantage in terms of the communication quality, for example, may represent high throughput, or stability of connectivity in terms of Mobility characteristics.

For example, when the radio quality of the Cell #2-A is relatively poor and the radio quality of the Cell #2-B is relatively good in the measurement result of the radio quality in the component carrier #2, the radio base station eNB may perform a process for instructing the handover to the Cell #1-B from the Cell #1-A and the handover to the Cell #2-B from the Cell #2-A.

This is because the handover to the Cell #1-B from the Cell #1-A is a handover between radio base stations and thus the Cell #2-A is needed to be deleted, the radio quality of the Cell #2-B serving as a handover destination radio base station is relatively good, and simultaneously instructing the handover to the Cell #2-B from the Cell #2-A and the handover to the Cell #1-B from the Cell #1-A is advantageous in terms of the communication quality.

Note that the advantage in terms of the communication quality, for example, may represent high throughput, or stability of connectivity in terms of Mobility characteristics.

In the aforementioned example, the Measurement report for each carrier for which Measurement is performed is transmitted. However, even when Measurement reports for a plurality of carriers for which Measurement is performed are transmitted, the mobile station, the radio base station, and the communication control method according to the present invention may be applied in the same manner.

In the aforementioned example, the number of carriers by which carrier aggregation is performed is two and the number of carriers by which the carrier aggregation is not performed but for which Measurement is performed is one. However, the number of carriers is an example. For example, even when the number of carriers is not one and two, the mobile station, the radio base station, and the communication control method according to the present invention may be applied.

Furthermore, in the aforementioned example, when a Measurement report is transmitted, the mobile station UE allows the Measurement report to include the measurement result of the radio quality for a carrier, other than the carrier in which it is determined to transmit the Measurement report. However, instead, when a control signal for notifying handover completion is transmitted, the mobile station UE may allow the control signal to include the measurement result of the radio quality for another carrier.

In this case, similarly to the aforementioned example, the other carrier may include the carrier other than the carrier in which it is determined to transmit the Measurement report, or a carrier other than a carrier by which a handover is performed.

The control signal may include a handover complete. Details of a process for allowing the handover complete to include the measurement result of the radio quality for the other carrier will not be repeated in order to avoid redundancy with details of the process for allowing the Measurement report to include the measurement result of the radio quality for the other carrier.

Note that when the mobile station UE transmits the handover complete, the Measurement control signal reception unit 108 may receive a handover command from the radio base station eNB, and the Measurement report transmission unit 106 may transmit the handover complete.

The Measurement report is transmitted to a radio base station serving as a handover source. However, the handover complete is transmitted to a radio base station serving as a handover destination.

Thus, the measurement result of the radio quality for the other carrier is included in the handover complete, so that it is possible for the radio base station serving as the handover destination to set carrier aggregation using a cell with a good radio quality immediately after a handover.

The characteristics of the present embodiment as described above may be expressed as follows.

A first characteristic of the present embodiment is summarized in that a mobile station UE, which communicates with a radio base station eNB using two or more carriers, includes: a carrier measurement unit 102 configured to measure the radio quality of a cell during communication or a neighboring cell for each of the two or more carriers; a determination unit 104 configured to determine whether to notify the radio base station eNB of a measurement result regarding each of the two or more carriers in the carrier measurement unit 102; and a Measurement report transmission unit 106 configured to transmit the measurement result in the carrier measurement unit 102 to the radio base station eNB when it is determined by the determination unit 104 to notify the radio base station eNB of the measurement result in the carrier measurement unit 102, wherein the Measurement report transmission unit 106 is configured to transmit, in addition to the measurement result regarding a carrier in which it is determined by the measurement unit 104 to notify the radio base station eNB of the measurement result in the carrier measurement unit 102, a measurement result regarding a carrier other than the carrier.

In the first characteristic of the present embodiment, the radio quality may include at least one of received power of a reference signal, received quality of the reference signal, SIR of the reference signal, Channel Quality Indicator, and Channel State Information.

In the first characteristic of the present embodiment, the determination unit 104 may determine to notify the radio base station eNB of the measurement result in the carrier measurement unit 102 at least one of when radio quality of a neighboring cell is superior to radio quality of a cell during communication by a predetermined offset, when the radio quality of the cell during communication exceeds a first threshold value, when the radio quality of the cell during communication is inferior to a second threshold value, when the radio quality of the neighboring cell exceeds a fifth threshold value, when the radio quality of the cell during communication is inferior to a third threshold value and the radio quality of the neighboring cell exceeds a fourth threshold value, and when it is a transmission timing when the measurement result is periodically transmitted.

In the first characteristic of the present embodiment, the Measurement report transmission unit 106 may transmit IDs and radio quality of a predetermined number of cells in an ascending order of the radio quality as the measurement result regarding the carrier other than the carrier in which it is determined by the measurement unit 104 to notify the radio base station eNB of the measurement result in the carrier measurement unit 102.

In the first characteristic of the present embodiment, when the carrier other than the carrier in which it is determined by the measurement unit 104 to notify the radio base station eNB of the measurement result in the carrier measurement unit 102, exists in a plural number, the Measurement report transmission unit 106 may transmit IDs and radio quality of a predetermined number of cells for each carrier in an ascending order of the radio quality.

In the first characteristic of the present embodiment, when the carrier other than the carrier in which it is determined by the measurement unit 104 to notify the radio base station eNB of the measurement result in the carrier measurement unit 102, exists in a plural number, the Measurement report transmission unit 106 may transmit IDs and radio quality of a predetermined number of cells for all carriers in an ascending order of the radio quality.

Moreover, in the first characteristic of the present embodiment, the predetermined number may be notified to the mobile station UE by the radio base station eNB.

In the first characteristic of the present embodiment, the carrier other than the carrier in which it is determined by the measurement unit 104 to notify the radio base station eNB of the measurement result in the carrier measurement unit 102, may be designated to the mobile station UE by the radio base station eNB.

In the first characteristic of the present embodiment, the Measurement report transmission unit 106 may transmit an ID and radio quality of a cell during communication through carrier aggregation as the measurement result regarding the carrier other than the carrier in which it is determined by the measurement unit 104 to notify the radio base station eNB of the measurement result in the carrier measurement unit 102.

A second characteristic of the present embodiment is summarized in that a radio base station eNB, which communicates with a mobile station UE using two or more carriers, includes: a Measurement control signal transmission unit 202 configured to transmit a control signal for instructing the measurement of the radio quality of a cell during communication or a neighboring cell to the mobile station UE; and a Measurement report reception unit 204 configured to receive a measurement result regarding each of the two or more carriers from the mobile station UE, wherein the measurement result includes, in addition to a measurement result regarding a carrier determined to be notified to the radio base station eNB, a measurement result regarding a carrier other than the carrier.

In the second characteristic of the present embodiment, the Measurement control signal transmission unit 202 may instruct to the mobile station UE to notify the radio base station eNB of the measurement result in the carrier measurement unit 102 at least one of when radio quality of a neighboring cell is superior to the radio quality of a cell during communication by a predetermined offset, when the radio quality of the cell during communication exceeds a first threshold value, when the radio quality of the cell during communication is inferior to a second threshold value, when the radio quality of the neighboring cell exceeds a fifth threshold value, when the radio quality of the cell during communication is inferior to a third threshold value and the radio quality of the neighboring cell exceeds a fourth threshold value, and when it is a transmission timing when the measurement result is periodically transmitted.

In the second characteristic of the present embodiment, the IDs and radio quality of a predetermined number of cells may be included in the measurement result in an ascending order of the radio quality as the measurement result regarding the carrier other than the carrier determined to be notified to the radio base station eNB.

In the second characteristic of the present embodiment, when the carrier other than the carrier determined to be notified to the radio base station eNB exists in a plural number, IDs and radio quality of a predetermined number of cells for each carrier may be included in an ascending order of the radio quality.

In the second characteristic of the present embodiment, when the carrier other than the carrier determined to be notified to the radio base station eNB exists in a plural number, IDs and radio quality of a predetermined number of cells for all carriers may be included in an ascending order of the radio quality.

In the second characteristic of the present embodiment, the Measurement control signal transmission unit 202 may notify the mobile station UE of the predetermined number.

In the second characteristic of the present embodiment, the Measurement control signal transmission unit 202 may designate the carrier other than the carrier determined to be notified to the radio base station eNB to the mobile station UE.

In the second characteristic of the present embodiment, the ID and radio quality of a cell during communication through carrier aggregation may be included in the measurement result as the measurement result regarding the carrier other than the carrier determined to be notified to the radio base station eNB.

A third characteristic of the present embodiment is summarized in that a communication control method in a mobile station UE, which communicates with a radio base station eNB using two or more carriers, includes: a first step of measuring the radio quality of a cell during communication or a neighboring cell for each of the two or more carriers; a second step of determining whether to notify the radio base station eNB of the measurement result regarding each of the two or more carriers; and a third step of transmitting the measurement result to the radio base station eNB when it is determined to notify the radio base station eNB of the measurement result, wherein, in the third step, in addition to the measurement result regarding a carrier determined to be notified to the radio base station eNB, a measurement result regarding a carrier other than the carrier is transmitted.

A fourth characteristic of the present embodiment is summarized in that a communication control method in a radio base station eNB, which communicates with a mobile station UE using two or more carriers, includes: a first step of transmitting a control signal for instructing the measurement of the radio quality of a cell during communication or a neighboring cell to the mobile station UE; and a second step of receiving a measurement result regarding each of the two or more carriers from the mobile station UE, wherein, in the second step, the measurement result includes, in addition to a measurement result regarding a carrier determined to be notified to the radio base station eNB, a measurement result regarding a carrier other than the carrier.

A fifth characteristic of the present embodiment is summarized in that a mobile station UE, which communicates with a radio base station eNB using two or more carriers, includes: a carrier measurement unit 102 configured to measure the radio quality of a cell during communication or a neighboring cell for each of the two or more carriers; and a handover control unit 206 configured to receive a control signal for instructing a handover from a radio base station serving as a handover source, and to transmit a control signal for notifying the completion of the handover from a radio base station serving as a handover destination, wherein the handover control unit 206 is configured to transmit, in addition to the control signal, a measurement result regarding a carrier other than a carrier by which a handover is performed.

Note that the operation of the mobile station UE and the radio base station eNB may be applied to a mobile station or a radio base station and a control station other than a system employing LTE-Advanced. For example, the operation of the mobile station UE and the radio base station eNB may be applied to a mobile station or a radio base station and a control station in LTE, WCDMA, CDMA2000, or WiMAX.

For example, when a mobile station performing communication in a WCDMA system performs the Measurement of two or more carriers of an LTE-Advanced system through Inter-RAT (Radio Access Technology) Measurement, the operation of the mobile station UE may be applied. Furthermore, in this case, a control station (Radio Network Controller) performs the operation of the radio base station eNB according to the present invention. That is, the operation of the radio base station eNB may be applied to the control station.

Alternatively, for example, when a mobile station performing communication in an LTE system performs the Measurement of two or more carriers, the operation of the mobile station UE may be applied. Furthermore, in this case, the operation of the radio base station eNB may be applied to a radio base station eNB of the LTE system.

Note that the operation of the mobile station UE or the radio base station eNB may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electrically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such storage medium and processor may be arranged in an ASIC. The ASIC may be arranged in the mobile station UE or the radio base station eNB. Furthermore, such storage medium and processor may be arranged in the mobile station UE or the radio base station eNB as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST

UE . . . Mobile station
102 . . . Carrier measurement unit
102A . . . First carrier measurement unit
102B . . . Second carrier measurement unit
102C . . . Third carrier measurement unit
104 . . . Determination unit
106 . . . Measurement report transmission unit
108 . . . Measurement control signal reception unit
eNB . . . Radio base station
202 . . . Measurement control signal transmission unit
204 . . . Measurement report reception unit
206 . . . Handover control unit

The invention claimed is:

1. A mobile station configured to communicate with a radio base station of a serving cell, the mobile station comprising:
a processor, in conjunction with a receiver, configured to:
maintain a list of cells including the serving cell and at least one neighboring cell, wherein the list is configurable by the radio base station,
measure radio quality of the serving cell for at least one carrier,
measure radio quality of the at least one neighboring cell for the at least one carrier, and
determine if a predetermined event is triggered based on first measurement results, the first measurement results comprising at least one of the measured radio quality of the serving cell and the measured radio quality of the at least one neighboring cell, the predetermined event being designated by the radio base station; and
a transmitter configured to transmit to the radio base station, if the predetermined event is triggered, a measurement report including:
the first measurement results that triggered the predetermined event; and
second measurement results comprising radio quality and a physical cell ID of:
a predetermined number of the neighboring cells in a carrier other than the at least one carrier for which the predetermined event is triggered; and
a neighboring cell having best radio quality,
wherein the list of cells is assigned to the mobile station by the radio base station of the serving cell,
wherein, in the second measurement results, the predetermined number of neighboring cells are listed in an order based on received power of a reference signal or received quality of the reference signal, and
wherein the predetermined number of the neighboring cells in the second measurement results is assigned to the mobile station by the radio base station of the serving cell.

2. The mobile station according to claim 1, wherein the radio quality includes at least one of received power of a reference signal, received quality of the reference signal, SIR of the reference signal, Channel Quality Indicator, and Channel State Information.

3. A radio base station of a serving cell that is configured to communicate with a mobile station, the radio base station comprising:

a processor, in conjunction with a transmitter, configured to transmit a control signal for instructing measurement of:
   radio quality of the serving cell for at least one carrier, and
   radio quality of at least one neighboring cell for the at least one carrier,
   wherein the processor configures a list of cells including the serving cell and the at least one neighboring cell maintained by the mobile station, and
   wherein a predetermined event is triggered based on first measurement results, the first measurement results comprising at least one of the measured radio quality of the serving cell and the measured radio quality of the at least one neighboring cell, the predetermined event being designated by the radio base station; and
a receiver, in conjunction with the processor, configured to receive, if the predetermined event is triggered, a measurement report including:
   the first measurement results that triggered the predetermined event; and
   a second measurement results comprising radio quality and a physical cell ID of:
      a predetermined number of the neighboring cells in a carrier other than the at least one carrier for which the predetermined event is triggered; and
      a neighboring cell having best radio quality,
   wherein the list of cells is assigned to the mobile station by the radio base station of the serving cell,
   wherein, in the second measurement results, the predetermined number of the neighboring cells are listed in an order based on received power of a reference signal or received quality of the reference signal, and
   wherein the predetermined number of the neighboring cells in the second measurement results is assigned to the mobile station by the radio base station of the serving cell.

4. A communication control method in a mobile station for communicating with a radio base station of a serving cell, the method comprising:
   maintaining a list of cells including the serving cell and at least one neighboring cell, wherein the list is configurable by the radio base station;
   measuring radio quality of the serving cell for at least one carrier;
   measuring radio quality of the at least one neighboring cell for the at least one carrier;
   determining if a predetermined event is triggered based on first measurement results, the first measurement results comprising at least one of the measured radio quality of the serving cell and the measured radio quality of the at least one neighboring cell, the predetermined event being designated by the radio base station; and
   transmitting to the radio base station, if the predetermined event is triggered, a measurement report including:
      the first measurement results that triggered the predetermined event; and
      a second measurement results comprising radio quality and a physical cell ID of:
         a predetermined number of the neighboring cells in a carrier other than the at least one carrier for which the predetermined event is triggered; and
         a neighboring cell having best radio quality,
      wherein the list of cells is assigned to the mobile station by the radio base station of the serving cell,
      wherein, in the second measurement results, the predetermined number of the neighboring cells are listed in an order based on received power of a reference signal or received quality of the reference signal, and
      wherein the predetermined number of the neighboring cells in the second measurement results is assigned to the mobile station by the radio base station of the serving cell.

5. A communication control method in a radio base station of a serving cell for communicating with a mobile station, the method comprising:
   configuring a list of cells including the serving cell and at least one neighboring cell maintained by the mobile station;
   transmitting a control signal for instructing measurement of:
      radio quality of the serving cell for at least one carrier, and
      radio quality of the at least one neighboring cell for the at least one carrier,
      wherein a predetermined event is triggered based on first measurement results, the first measurement results comprising at least one of the measured radio quality of the serving cell and the measured radio quality of the at least one neighboring cell, the predetermined event being designated by the radio base station; and
   receiving, if the predetermined event is triggered, a measurement report including:
      the first measurement results that triggered the predetermined event; and
      a second measurement results comprising radio quality and a physical cell ID of:
         a predetermined number of the neighboring cells in a carrier other than the at least one carrier for which the predetermined event is triggered; and
         a neighboring cell having best radio quality,
      wherein the list of cells is assigned to the mobile station by the radio base station of the serving cell,
      wherein, in the second measurement results, the predetermined number of the neighboring cells are listed in an order based on received power of a reference signal or received quality of the reference signal, and
      wherein the predetermined number of the neighboring cells in the second measurement results is assigned to the mobile station by the radio base station of the serving cell.

* * * * *